(12) United States Patent
Ohta

(10) Patent No.: US 10,240,835 B2
(45) Date of Patent: Mar. 26, 2019

(54) REFRIGERATION CYCLE DEVICE AND PILOT ON-OFF VALVE

(71) Applicant: DENSO CORPORATION, Kariya, Aichi-pref. (JP)

(72) Inventor: Hiromi Ohta, Okazaki (JP)

(73) Assignee: DENSO CORPORTION, Kariya, Aichi-pref. (JP)

( * ) Notice: Subject to any disclaimer, the term of this patent is extended or adjusted under 35 U.S.C. 154(b) by 455 days.

(21) Appl. No.: 14/433,111

(22) PCT Filed: Sep. 2, 2013

(86) PCT No.: PCT/JP2013/005166
§ 371 (c)(1),
(2) Date: Apr. 2, 2015

(87) PCT Pub. No.: WO2014/054218
PCT Pub. Date: Apr. 10, 2014

(65) Prior Publication Data
US 2015/0260439 A1 Sep. 17, 2015

(30) Foreign Application Priority Data
Oct. 3, 2012 (JP) .................. 2012-221014

(51) Int. Cl.
*F16K 15/00* (2006.01)
*F25B 49/02* (2006.01)
(Continued)

(52) U.S. Cl.
CPC ......... *F25B 49/02* (2013.01); *B60H 1/00914* (2013.01); *B60H 1/00921* (2013.01);
(Continued)

(58) Field of Classification Search
CPC ................ F25B 2400/04; F25B 2600/2501
See application file for complete search history.

(56) References Cited

U.S. PATENT DOCUMENTS

2002/0104327 A1* 8/2002 Murase .................. B60H 1/323
62/228.3
2006/0266420 A1* 11/2006 Lonnes ................... F16K 3/265
137/496

FOREIGN PATENT DOCUMENTS

CN 101122343 A 2/2008
CN 102537480 A 7/2012
(Continued)

OTHER PUBLICATIONS

International Search Report and Written Opinion (in Japanese with English Translation) for PCT/JP2013/005166, dated Nov. 26, 2013; ISA/JP.
(Continued)

*Primary Examiner* — Larry Furdge
*Assistant Examiner* — Nael Babaa
(74) *Attorney, Agent, or Firm* — Harness, Dickey & Pierce, P.L.C.

(57) ABSTRACT

A pilot on-off valve in a refrigeration cycle device includes a main on-off valve that opens or closes a bypass passage through which a high-pressure side portion and a low-pressure side portion of a cycle communicate with each other, and a pilot valve that opens or closes a communication passage through which an inflow port and an outflow port of the pilot on-off valve communicate with each other. When the main on-off valve opens the bypass passage, the pilot valve opens the communication passage in a state where a refrigerant passage, in which a refrigerant flowing out of the pilot on-off valve flows, is closed.

9 Claims, 24 Drawing Sheets

(51) Int. Cl.
*F25B 5/00* (2006.01)
*F25B 41/06* (2006.01)
*B60H 1/00* (2006.01)

(52) U.S. Cl.
CPC ............... *F16K 15/00* (2013.01); *F25B 5/00* (2013.01); *F25B 41/062* (2013.01); *F25B 2341/0671* (2013.01); *F25B 2400/0409* (2013.01); *F25B 2600/2519* (2013.01); *Y10T 137/7837* (2015.04)

(56) References Cited

FOREIGN PATENT DOCUMENTS

| JP | H04262181 A | | 9/1992 | |
| JP | 07243547 A | * | 9/1995 | |
| JP | H07243547 A | | 9/1995 | |
| JP | H0794873 B2 | | 10/1995 | |
| JP | H09-264449 | | 10/1997 | |
| JP | H11-344145 | | 12/1998 | |
| JP | 2000-249248 | | 9/2000 | |
| JP | 2002267294 A | * | 9/2002 | |
| JP | 2002267294 A | | 9/2002 | |
| JP | 4238656 B2 | | 3/2009 | |
| JP | 2011094884 A | | 5/2011 | |
| JP | 2011225039 A | | 11/2011 | |
| JP | 2011235753 A | * | 11/2011 | ......... B60H 1/00485 |
| JP | 2011235753 A | | 11/2011 | |

OTHER PUBLICATIONS

Office Action dated Jul. 28, 2015, mailed in the corresponding JP application No. 2012-221014 with English translation.
Office Action dated Feb. 23, 2016, dated in the corresponding JP application No. 2012-221014 with English translation.
Office Action dated Feb. 3, 2016, mailed in the corresponding CN application No. 201380051844.2 with English translation.

* cited by examiner

1ST DEHUMIDIFICATION HEATING MODE (1ST MODE)

1ST DEHUMIDIFICATION HEATING MODE (2ND MODE)

1ST DEHUMIDIFICATION HEATING MODE (3RD MODE)

1ST DEHUMIDIFICATION HEATING MODE (4TH MODE)

2ND DEHUMIDIFICATION HEATING MODE

REFRIGERATION CYCLE DEVICE AND PILOT ON-OFF VALVE

CROSS REFERENCE TO RELATED APPLICATIONS

This application is a U.S. National Phase Application under 35 U.S.C. 371 of International Application No. PCT/JP2013/005166 filed on Sep. 2, 2013 and published in Japanese as WO 2014/054218 A1 on Apr. 10, 2014. This application is based on and claims the benefit of priority from Japanese Patent Application No. 2012-221014 filed on Oct. 3, 2012. The entire disclosures of all of the above applications are incorporated herein by reference.

TECHNICAL FIELD

The present disclosure relates to a vapor compression type refrigeration cycle device and a pilot on-off valve that is applied to the vapor compression type refrigeration cycle device.

BACKGROUND ART

Patent Document 1 has disclosed a pilot on-off valve functioning as a refrigerant circuit switching device that is applied to a vapor compression type refrigeration cycle device and switches a refrigerant circuit. In the pilot on-off valve of Patent Document 1, refrigerant pressure in a pilot space (a space to which refrigerant pressure biasing a main on-off valve in a valve closing direction is applied) is changed by the operation of a pilot valve, so that the main on-off valve is opened and closed.

If the main on-off valve is opened when a pressure difference between refrigerant pressure on the upstream side of the main on-off valve and refrigerant pressure on the downstream side of the main on-off valve (hereinafter, referred to as differential pressure between the front and rear sides of the main on-off valve) is large in this kind of pilot on-off valve, a refrigerant flows from a high-pressure side of the cycle to a low-pressure side of the cycle at a burst. For this reason, a large amount of refrigerant passing noise is generated.

Accordingly, the pilot on-off valve of Patent Document 1 reduces a refrigerant passing noise by being adapted to gradually discharge a refrigerant, which is present in the pilot space, through a capillary tube or the like so that the main on-off valve is gradually opened, when the main on-off valve is opened.

PRIOR ART DOCUMENT

Patent Document

Patent Document 1: Japanese Patent No. 4238656

SUMMARY OF THE INVENTION

However, according to the examination of the inventor of this application, since the main on-off valve is merely adapted to be gradually opened in the pilot on-off valve of Patent Document 1, occasionally, a refrigerant passing noise that is generated when the main on-off valve starts to be opened cannot be sufficiently reduced while differential pressure between the front and rear sides of the main on-off valve is large.

A method, which sufficiently reduces a refrigerant passing noise by opening the main on-off valve after reducing differential pressure between the front and rear sides of the main on-off valve by lowering refrigerant pressure on the high-pressure side of the refrigeration cycle device, is considered in this regard. However, if refrigerant pressure on the high-pressure side is lowered in the vapor compression type refrigeration cycle device, there is a concern that refrigerating capacity cannot be exerted and energy for raising the pressure of the refrigerant again may be required. In addition, if the refrigerant pressure on the high-pressure side is lowered when a refrigerant present on the high-pressure side is used as a heat source to heat blown air and to heat an air-conditioning target space, the temperature of blown-out air is lowered. For this reason, comfort at the time of heating may significantly deteriorate.

In consideration of the above-described points, it is a first objective of the present disclosure to sufficiently reduce a refrigerant passing noise, which is generated when a pilot on-off valve is opened, without lowering refrigerant pressure on a high-pressure side in a refrigeration cycle device including a pilot on-off valve.

Further, it is a second objective of the present disclosure to sufficiently reduce a refrigerant passing noise, which is generated when a pilot on-off valve is opened, without lowering refrigerant pressure on a high-pressure side of a refrigeration cycle device in the pilot on-off valve applied to the refrigeration cycle device.

According to a first aspect of the present disclosure, a refrigeration cycle device includes a compressor that compresses and discharges a refrigerant, a depressurizing device that depressurizes a high-pressure refrigerant discharged from the compressor, a bypass passage connecting a portion of a cycle, which extends from a discharge port side of the compressor to an inlet side of the depressurizing device, and a portion of the cycle, which extends from an outlet side of the depressurizing device to a suction port side of the compressor, a pilot on-off valve that opens or closes the bypass passage, and a downstream open-close device that opens or closes a refrigerant passage through which a refrigerant flowing out of the pilot on-off valve passes. The pilot on-off valve includes an inflow port into which a refrigerant flows, and an outflow port from which a refrigerant flows out. The pilot on-off valve includes a main on-off valve that opens the bypass passage when a pressure difference between a refrigerant pressure in the inflow port and refrigerant pressure in the outflow port becomes lower than or equal to a predetermined reference pressure difference, and a pilot valve that opens or closes a communication passage through which the inflow port and the outflow port communicate with each other. When the main on-off valve opens the bypass passage, the pilot valve opens the communication passage in a state where the downstream open-close device closes the refrigerant passage.

According to this, since the pilot valve opens the communication passage when the main on-off valve opens the bypass passage, a pressure difference between refrigerant pressure on the inlet port side and refrigerant pressure on the outlet port side, that is, differential pressure between the front and rear sides of the main on-off valve can be reduced.

Moreover, since the pilot valve opens the communication passage in a state where a downstream open-close device closes the refrigerant passage, the refrigerant pressure on the outlet port side can be made to approach the pressure of a high-pressure refrigerant on the inlet port side.

As a result, a refrigerant passing noise, which is generated when the main on-off valve opens the bypass passage can be sufficiently reduced, by reducing differential pressure between the front and rear sides of the main on-off valve without lowering refrigerant pressure on the high-pressure side of the cycle.

According to a second aspect of the present disclosure, a pilot on-off valve is applied to a vapor compression type refrigeration cycle device. The pilot on-off valve includes: a body that includes an inflow port into which a high-pressure refrigerant flows, an outflow port from which a refrigerant from the inflow port flows out, and a main passage guiding a refrigerant from the inflow port to the outflow port; a main on-off valve that opens the main passage when a pressure difference between a refrigerant pressure in the inflow port and a refrigerant pressure in the outflow port becomes lower than or equal to a predetermined reference pressure difference; and a pilot valve that opens or closes a communication passage through which the inflow port and the outflow port communicate with each other. When the pilot valve opens the communication passage, the high-pressure refrigerant is guided from the inflow port to the outflow port through the communication passage.

According to this, since the pilot valve opens the communication passage, a pressure difference between refrigerant pressure on the inlet port side and refrigerant pressure on the outlet port side, that is, differential pressure between the front and rear sides of the main on-off valve can be reduced.

In addition, since a high-pressure refrigerant present in the inlet port side is guided to the outlet port side through the communication passage, the refrigerant pressure on the outlet port side can approach the pressure of a high-pressure refrigerant on the inflow port side.

As a result, a refrigerant passing noise, which is generated when the main on-off valve opens the main passage can be sufficiently reduced, by reducing differential pressure between the front and rear sides of the main on-off valve without lowering refrigerant pressure on the high-pressure side of the refrigeration cycle device.

In addition, in the pilot on-off valve of the second aspect, the refrigeration cycle device may include a downstream open-close device that opens or closes a refrigerant passage in which a refrigerant flowing out of the pilot on-off valve flows, and the pilot valve may open the communication passage while the downstream open-close device closes the refrigerant passage. According to this, the refrigerant pressure on the outlet port side can more reliably approach the pressure of a high-pressure refrigerant on the inlet port side.

EMBODIMENTS FOR EXPLOITATION OF THE INVENTION

Figure 1:
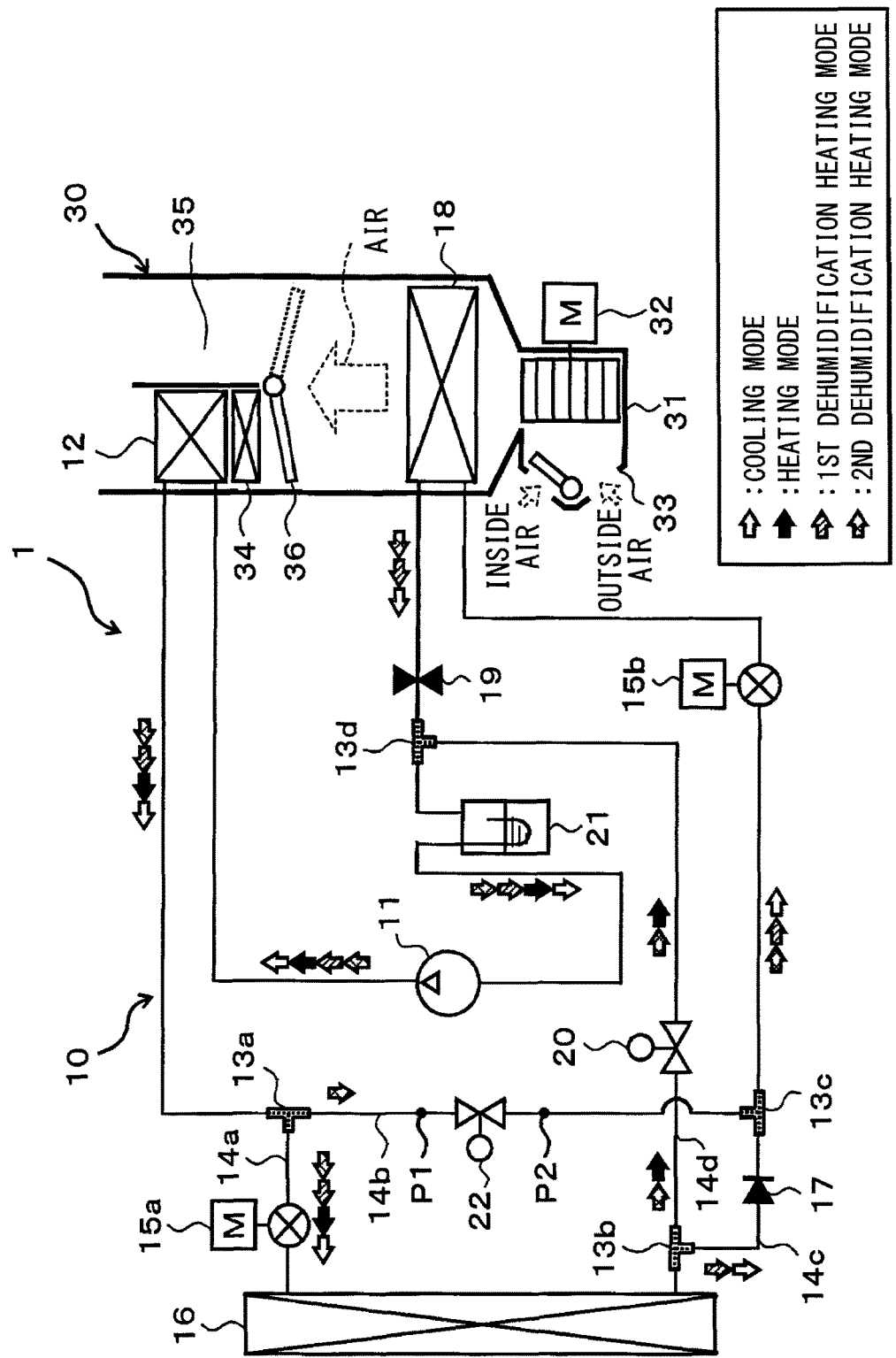
FIG. 1 is a schematic diagram showing a refrigerant circuit of a refrigeration cycle device according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 11. In the present embodiment, a refrigeration cycle device 10 is applied to a vehicle air conditioning system 1 for a hybrid vehicle that obtains a drive force for the traveling of a vehicle from both an engine that is an internal combustion engine and an electric motor for the traveling of a vehicle. The refrigeration cycle device 10 functions to cool or heat air blown into the vehicle interior, which is an air-conditioning target space, in the vehicle air conditioning system 1.

In addition, the refrigeration cycle device 10 is adapted to be capable of being switched to a refrigerant circuit for a cooling mode that cools the vehicle interior by cooling blown air, a refrigerant circuit for a heating mode that heats the vehicle interior by heating blown air, a refrigerant circuit for a first dehumidification heating mode that dehumidifies and heats the vehicle interior by reheating blown air having been dehumidified through cooling, or a refrigerant circuit for a second dehumidification heating mode that is performed when the temperature of outside air is at a very low temperature (for example, 0° C. or less) or the like and dehumidifies and heats the vehicle interior with increasing the heating capacity of blown air more than that of the first dehumidification heating mode.

In FIG. 1, the flow of a refrigerant in the refrigerant circuit for the cooling mode is indicated by a white arrow, the flow of a refrigerant in the refrigerant circuit for the heating mode is indicated by a black arrow, the flow of a refrigerant in the refrigerant circuit for the first dehumidification heating mode is indicated by a diagonally hatched arrow, and the flow of a refrigerant in the refrigerant circuit for the second dehumidification heating mode is indicated by a shaded-hatched arrow.

Further, the refrigeration cycle device 10 employs an HFC based refrigerant (specifically, R134a) as the refrigerant, and forms a vapor compression type subcritical refrigerating cycle in which high-pressure side refrigerant pressure Pd does not exceed the critical pressure of the refrigerant. The refrigeration cycle device 10 may employ an HFO based refrigerant (for example, R1234yf) or the like. Furthermore, refrigerant oil for lubricating a compressor 11 is mixed with the refrigerant, and a portion of the refrigerant oil circulates in the cycle together with the refrigerant.

Among components of the refrigeration cycle device 10, the compressor 11 is disposed in an engine room, sucks the refrigerant into the refrigeration cycle device 10, and compresses and discharges the refrigerant. The compressor 11 is formed of an electric compressor that drives a fixed capacity type compression mechanism having fixed discharge capacity by an electric motor. The operation (rotational speed) of the electric motor of the compressor 11 is controlled by a control signal that is output from an air-conditioning control device to be described below.

A refrigerant inlet side of an indoor condenser 12 is connected to a discharge port of the compressor 11. The indoor condenser 12 is a heat exchanger for heating that is disposed in a casing 31 of an indoor air conditioning unit 30 to be described below and heats blown air by exchanging heat between a discharged refrigerant (high-pressure refrigerant) discharged from the compressor 11 and the blown air having passed through an indoor evaporator 18 to be described below.

One refrigerant inflow-outlet of a first three-way joint 13a, which branches the flow of a refrigerant flowing out of the indoor condenser 12 at the time of the second dehumidification heating mode, is connected to a refrigerant outlet side of the indoor condenser 12. The three-way joint may be formed by joining pipes having different diameters, and may be formed by forming a plurality of refrigerant passages in a metal block or a resin block. The basic structures of second to fourth three-way joints 13b to 13d to be described below are also the same as that of the first three-way joint 13a.

A first refrigerant passage 14a guiding the refrigerant, which flows out of the indoor condenser 12, to a refrigerant inlet side of an outdoor heat exchanger 16 is connected to another refrigerant inflow-outlet of the first three-way joint 13a. Further, a second refrigerant passage 14b guiding the refrigerant, which flows out of the indoor condenser 12, to an inlet side of a second expansion valve 15b, which is disposed on a third refrigerant passage 14c to be described below, is connected to the other refrigerant inflow-outlet of the first three-way joint 13a.

A first expansion valve 15a as an example of a depressurizing device, which depressurizes the refrigerant flowing out of the indoor condenser 12 at the time of a heating mode, the first and second dehumidification heating modes, and the like, is disposed on the first refrigerant passage 14a. The first expansion valve 15a is a variable throttle mechanism including a valve body of which a throttle opening is adapted to be changeable and an electric actuator that is formed of a stepping motor changing the throttle opening of the valve body.

In addition, the first expansion valve 15a is configured as a variable throttle mechanism having a full-open function to function as a simple refrigerant passage without exerting much refrigerant depressurizing action by making its throttle opening be fully open. The operation of the first expansion valve 15a is controlled by the control signal (control pulse) that is output from the air-conditioning control device.

The refrigerant inlet side of the outdoor heat exchanger 16 is connected to an outlet side of the first expansion valve 15a. The outdoor heat exchanger 16 is disposed on the front side of a vehicle in the engine room, and exchanges heat between the refrigerant that flows in the outdoor heat exchanger and vehicle outside air (outside air) that is blown from a blower fan (not shown). The blower fan is an electrical blower of which the rotational speed (blowing capacity) is controlled by a control voltage output from the air-conditioning control device.

One refrigerant inflow-outlet of the second three-way joint 13b is connected to a refrigerant outlet side of the outdoor heat exchanger 16. The third refrigerant passage 14c guiding the refrigerant, which flows out of the outdoor heat exchanger 16, to a refrigerant inlet side of the indoor evaporator 18 is connected to another refrigerant inflow-outlet of the second three-way joint 13b. Further, a fourth refrigerant passage 14d guiding the refrigerant, which flows out of the outdoor heat exchanger 16, to a suction side of the compressor 11 through an accumulator 21 to be described below is connected to the other refrigerant inflow-outlet of the second three-way joint 13b.

A check valve 17, which merely allows a refrigerant to flow to the indoor evaporator 18 from the second three-way joint 13b, the third three-way joint 13c to which the above-mentioned second refrigerant passage 14b is connected, and the second expansion valve 15b, which depressurizes a refrigerant flowing into the indoor evaporator 18, are disposed in this order relative to the flow of a refrigerant on the third refrigerant passage 14c.

The basic structure of the second expansion valve 15b is the same as that of the first expansion valve 15a. Moreover, the second expansion valve 15b of the present embodiment is formed of a variable throttle mechanism having not only a full-open function that fully opens a refrigerant passage reaching the indoor evaporator 18 from the outdoor heat exchanger 16 when a throttle opening is made to be a full opening, but also a full-closed function that fully closes the refrigerant passage when a throttle opening is fully closed.

Accordingly, in the refrigeration cycle device 10 of the present embodiment, a refrigerant circuit can be switched by closing the third refrigerant passage 14c while fully closing the second expansion valve 15b. In other words, the second expansion valve 15b functions as a refrigerant circuit switching device for switching a refrigerant circuit of a refrigerant that circulates in the cycle.

The indoor evaporator 18 is a heat exchanger for cooling that is disposed on the upstream side of the indoor condenser 12 in the flow of blown air in the casing 31 of the indoor air conditioning unit 30 and cools blown air by exchanging heat between a refrigerant, which flows in the indoor evaporator, and blown air, which does not yet pass through the indoor condenser 12, and evaporating the refrigerant at the time of the cooling mode and the first and second dehumidification heating modes to make the refrigerant exert a heat absorbing action.

An evaporating pressure regulating valve (EPR) 19, which maintains the refrigerant evaporation pressure of the indoor evaporator 18 at a pressure equal to or higher than reference refrigerant evaporation pressure that is determined in advance so that frost is not formed on the indoor evaporator 18, is connected to the other refrigerant outlet side of the indoor evaporator 18.

The following mechanical variable throttle mechanism and the like can be employed as this evaporating pressure regulating valve 19. This mechanical variable throttle mechanism includes a valve body that adjusts the opening of an internal refrigerant passage formed in the mechanical variable throttle mechanism, and an elastic member (spring) that applies a load biasing the valve body to a side where the internal refrigerant passage is closed. The mechanical variable throttle mechanism increases a valve opening with an increase of a pressure difference that is obtained by subtracting the outside air pressure (atmospheric pressure), which is applied to the elastic member, from the pressure of the refrigerant at the inlet side of the internal refrigerant passage (the refrigerant evaporation pressure in the indoor evaporator).

When the fluctuation of flow rate of a refrigerant circulating in the cycle is small, or the like, a fixed throttle including an orifice, a capillary tube, and the like may be employed instead of the evaporating pressure regulating valve 19. Further, the suction side of the compressor 11 is connected to an outlet side of the evaporating pressure regulating valve 19 through the fourth three-way joint 13d to which the above-mentioned fourth refrigerant passage 14d and the accumulator 21 are connected.

An on-off valve 20, which opens or closes the fourth refrigerant passage 14d, is disposed on the fourth refrigerant passage 14d that connects the second three-way joint 13b and the fourth three-way joint 13d. The on-off valve 20 is a solenoid valve of which the operation is controlled by the control signal output from the air-conditioning control device, and functions as the refrigerant circuit switching device together with the second expansion valve 15b.

The accumulator 21 is a gas-liquid separator that separates gas and liquid in the refrigerant flowing into the accumulator 21 and stores a surplus liquid-phase refrigerant of the cycle. A suction port side of the compressor 11 is connected to a gas-phase refrigerant outlet of the accumulator 21. Accordingly, since the suction of a liquid-phase refrigerant into the compressor 11 is prevented, the compression of liquid in the compressor 11 can be prevented.

Next, the second refrigerant passage 14b, which connects the first three-way joint 13a and the third three-way joint 13c, will be described. Here, when the first expansion valve 15a is made to function as an example of the depressurizing device as described above, the first three-way joint 13a becomes a high-pressure side portion of a cycle reaching an inlet side of the first expansion valve 15a from a discharge port side of the compressor 11 and the third three-way joint 13c becomes a low-pressure side portion of a cycle that reaches the suction port side of the compressor 11 from the outlet side of the first expansion valve 15a. Accordingly, the second refrigerant passage 14b may be used as an example of a bypass passage that connects the high-pressure side portion of the cycle to the low-pressure side portion of the cycle.

In addition, a pilot on-off valve 22, which opens or closes the second refrigerant passage 14b, is disposed on the second refrigerant passage 14b. The pilot on-off valve 22 is an on-off valve of which the operation is controlled by a control signal output from the air-conditioning control device, and functions as the refrigerant circuit switching device together with the second expansion valve 15b and the on-off valve 20. Further, the above-mentioned second expansion valve 15b having a full-close function may be used as an example of a downstream open-close device that opens or closes the refrigerant passage in which the refrigerant flows out of the pilot on-off valve 22.

Figure 2:
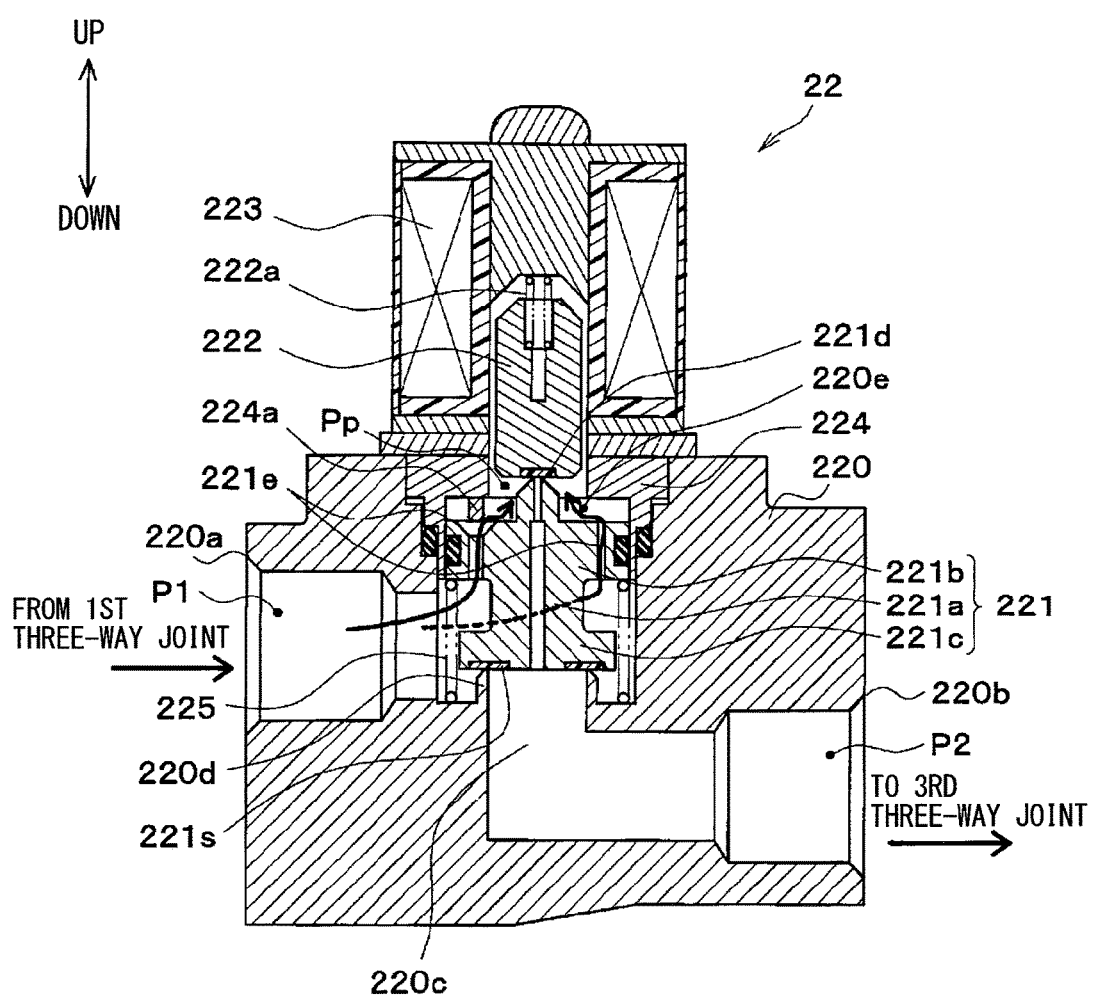
FIG. 2 is a schematic sectional view showing a state in which a main on-off valve of a pilot on-off valve is closed, according to the first embodiment.

The specific structure of the pilot on-off valve 22 will be described with reference to FIG. 2. An upward arrow and a downward arrow of FIG. 2 indicate an upward direction and a downward direction, respectively, when the refrigeration cycle device 10 is mounted in a vehicle. This is also applied to the following drawings. Further, FIG. 2 shows a state in which the pilot on-off valve 22 closes the second refrigerant passage 14b (the bypass passage).

The pilot on-off valve 22 of the present embodiment includes the body 220 in which a main passage 220c in which a refrigerant flows is formed, a main on-off valve 221 that opens or closes the second refrigerant passage 14b by opening and closing the main passage 220c, a pilot valve 222 that opens or closes an outlet-side communication passage 221d formed in the main on-off valve 221, a solenoid 223 that displaces the pilot valve 222, and the like.

First, the body 220 includes an inflow port 220a, an outflow port 220b, the main passage 220c, and the like that are formed in a metal block. The inflow port 220a is connected to the first three-way joint 13a (the high-pressure side of the cycle), and allows a high-pressure refrigerant to flow in. The outflow port 220b allows the refrigerant, which has flowed in from the inflow port 220a, to flow out to the third three-way joint 13c (the low-pressure side of the cycle). The main passage 220c guides the refrigerant to the outflow port 220b from the inflow port 220a.

Moreover, a substantially cylindrical seat portion 220d, which protrudes upward in a vertical direction, is formed at a middle portion of the main passage 220c of the body 220. Further, the main on-off valve 221 comes into contact with an apex portion (an upper end portion in FIG. 2) of the seat portion 220d as shown in FIG. 2, so that the main passage 220c is closed.

The main on-off valve 221 includes a columnar portion 221a that extends in the vertical direction so as to be coaxial with the seat portion 220d, an upper surface-side disc-shaped portion 221b that is disposed on an upper surface side of the columnar portion 221a and expands in a radial direction, and a bottom-side disc-shaped portion 221c that is disposed on a bottom side and expands in the radial direction. Further, a resinous seal member 221s, which is disposed on the bottom of the bottom-side disc-shaped portion 221c, forms a contact portion that comes into contact with the apex portion of the seat portion 220d.

Furthermore, the upper surface-side disc-shaped portion 221b partitions and forms a pilot space 220e together with a pilot space forming member 224 that is disposed above the main on-off valve 221. A cylinder portion, which is positioned on the outer peripheral side of the upper surface-side disc-shaped portion 221b, is formed on the pilot space forming member 224. Moreover, since a seal member, such as an O-ring, is disposed in a gap between the outer peripheral side of the upper surface-side disc-shaped portion 221b and the inner peripheral side of the cylinder portion, refrigerant does not leak from the gap.

The pilot space 220e is a space to which refrigerant pressure biasing the main on-off valve 221 in a valve closing direction is applied. When refrigerant pressure P2 at the outflow port 220b is lowered in a state where refrigerant pressure P1 of a high-pressure refrigerant at the inflow port 220a is applied to the pilot space 220e, a load in the valve closing direction (a downward direction in FIG. 2) is applied to the main on-off valve 221 by a pressure difference between the refrigerant pressure P1 at the inflow port 220a and the refrigerant pressure P2 at the outflow port 220b. Accordingly, the main on-off valve 221 is pressed against the seat portion 220d.

In addition, a main on-off valve spring 225, which is an example of an elastic member applying a load biasing the main on-off valve 221 in a valve opening direction, is disposed in the body 220. For this reason, when a pressure difference between the refrigerant pressure P1 at the inflow port 220a and the refrigerant pressure P2 at the outflow port 220b is reduced and a load applied to the main on-off valve 221 in the valve closing direction becomes smaller than a load that is generated in the valve opening direction (an upward direction in FIG. 2) by the main on-off valve spring 225, the main on-off valve 221 is separated from the seat portion 220d.

That is, the main on-off valve 221 of the present embodiment is adapted so as to open the main passage 220c when a pressure difference between the refrigerant pressure P1 of a high-pressure refrigerant at the inflow port 220a and the refrigerant pressure P2 at the outflow port 220b becomes equal to or smaller than a reference pressure difference that is determined by the load of the main on-off valve spring 225. The pilot space forming member 224 is formed of a member separate from the body 220 in the present embodiment, but may be formed integrally with the body 220.

Further, the outlet-side communication passage 221d, which allows the pilot space 220e to communicate with the outflow port 220b of the main passage 220c corresponding to the downstream side of the main on-off valve 221 in the flow of a refrigerant, is formed at a central portion of the main on-off valve 221. Furthermore, inlet-side communication passages 221e, which allow the pilot space 220e to communicate with the inflow port 220a of the main passage 220c corresponding to the upstream side of the main on-off valve 221 in the flow of a refrigerant, are formed at the upper surface-side disc-shaped portion 221b of the main on-off valve 221.

A plurality of inlet-side communication passages 221e are formed, and the total refrigerant passage area of the inlet-side communication passages 221e is larger than that of the outlet-side communication passage 221d. Moreover, passage closing pins 224a as an example of a passage area-reducing portion are fixed to the pilot space forming member 224. The passage area-reducing portion closes a part of the inlet-side communication passages 221e when the main on-off valve 221 opens the main passage 220c, thereby reducing the total refrigerant passage area of the inlet-side communication passages 221e more than when the main on-off valve 221 closes the main passage 220c.

The term "the refrigerant passage area of the inlet-side communication passages 221e" means the minimum passage area of the inlet-side communication passage 221e when one inlet-side communication passage 221e is formed, and means the total refrigerant passage area that is the sum of the minimum passage areas of the respective inlet-side communication passages 221e when a plurality of inlet-side communication passages 221e are formed. This is also applied to the refrigerant passage area of the outlet-side communication passage 221d.

Further, the pilot valve 222, which opens or closes the outlet-side communication passage 221d formed at the central portion of the main on-off valve 221 and is formed in a substantially columnar shape, is disposed in the pilot space 220e. The pilot valve 222 is disposed coaxially with the central axis of the main on-off valve 221, and is displaced to a side, to which the pilot valve 222 is separated from the main on-off valve 221, (the upper side in FIG. 2) by an electromagnetic force that is generated when electric power is supplied to the solenoid 223 disposed on the outer peripheral side of the pilot valve 222 from the air-conditioning control device (ON). Accordingly, the pilot valve 222 opens the outlet-side communication passage 221d.

When the supply of electric power to the solenoid 223 from the air-conditioning control device is cut off (OFF), the pilot valve 222 is displaced to the main on-off valve 221 by the load of a pilot spring 222a. Accordingly, the pilot valve 222 closes the outlet-side communication passage 221d. That is, in the pilot on-off valve 22, the pilot valve 222 displaces the main on-off valve 221 by opening and closing the outlet-side communication passage 221d to change refrigerant pressure Pp in the pilot space 220e.

A load, which is caused by a pressure difference between the refrigerant pressure P1 at the inflow port 220a and the refrigerant pressure P2 at the outflow port 220b, is not applied to the pilot valve 222 as apparent from FIG. 2. Accordingly, the pilot valve 222 can displace the main on-off valve 221 with a load smaller than a load (electromagnetic force) that is required when the pilot valve 222 directly displaces the main on-off valve 221.

Next, the indoor air conditioning unit 30 will be described. The indoor air conditioning unit 30 is used to blow air, of which the temperature has been adjusted by the refrigeration cycle device 10, into the vehicle interior, and is disposed inside a dashboard (instrument panel) positioned at the foremost portion in the vehicle interior. Moreover, the indoor air conditioning unit 30 is formed so as to receive a blower 32, the indoor evaporator 18, the indoor condenser 12, and the like in the casing 31 that forms the outer shell of the indoor air conditioning unit 30.

The casing 31 forms an air passage for blown air that is blown into the vehicle interior, and is made of a resin (for example, polypropylene) that has a certain degree of elasticity and is also excellent in terms of strength. An inside-outside air switching device 33 as an inside-outside air switching device for switching and introducing inside air (vehicle interior air) and outside air (vehicle exterior air) into the casing 31 is disposed on the farthest upstream side in the flow of blown air in the casing 31.

The inside-outside air switching device 33 continuously changes the ratio between the air volume of inside air and the air volume of outside air by continuously adjusting the area of an inside air inlet port, which introduces inside air into the casing 31, and the area of an outside air-introduction port, which introduces outside air into the casing 31, with an inside-outside air switching door. The inside-outside air switching door is driven by an electric actuator for the inside-outside air switching door, and the operation of the electric actuator is controlled by a control signal that is output from the air-conditioning control device.

A blower 32 as a blowing device for blowing air, which is sucked through the inside-outside air switching device 33, into the vehicle interior is disposed on the downstream side of the inside-outside air switching device 33 in the flow of blown air. The blower 32 is an electrical blower that drives a centrifugal multi-blade fan (sirocco fan) with an electric motor, and the rotational speed (blowing rate) of the blower 32 is controlled by a control voltage that is output from the air-conditioning control device.

The indoor evaporator 18, a heater core 34, and the indoor condenser 12 are disposed in this order relative to the flow of blown air on the downstream side of the blower 32 in the flow of blown air. In other words, the indoor evaporator 18 is disposed on the upstream side of the heater core 34 and the indoor condenser 12 in the flow of blown air.

The heater core 34 is a heat exchanger for heating that heats blown air by exchanging heat between a coolant for an engine, which outputs a drive force for the traveling of a vehicle, and the blown air. The heater core 34 of the present embodiment is disposed on the upstream side of the indoor condenser 12 in the flow direction of blown air. Further, a cold air bypass passage 35, which allows blown air having passed through the indoor evaporator 18 to bypass the heater core 34 and the indoor condenser 12 and flow to the downstream side, is formed in the casing 31.

An air-mix door 36 adjusting the ratio of the flow rate of air, which passes through the indoor condenser 12, to the flow rate of blown air, which has passed through the indoor evaporator 18, is disposed on the downstream side of the indoor evaporator 18 and the upstream side of the heater core 34 in the flow of blown air.

Furthermore, a mixing space, which allows blown air heated by the heater core 34 and the indoor condenser 12 to be mixed with blown air passing through the cold air bypass passage 35 without being heated by the heater core 34 and the indoor condenser 12, is formed on the downstream side of the indoor condenser 12 in the flow of blown air. In addition, an opening hole, through which the blown air mixed in the mixing space (air-conditioning air) is blown into the vehicle interior as an air-conditioning target space, is disposed on the farthest downstream portion of the casing 31 in the flow of blown air.

Specifically, a face opening hole through which the air-conditioning air is blown toward the upper body of an occupant present in the vehicle interior, a foot opening hole through which the air-conditioning air is blown toward feet of an occupant, and a defroster opening hole through which the air-conditioning air is blown toward the inner surface of a windshield of a vehicle (all of them are not shown) are provided as this opening hole. The downstream sides of the face opening hole, the foot opening hole, and the defroster opening hole in the flow of blown air are connected to a face air outlet port, a foot air outlet port, and a defroster air outlet port (all of them are not shown), which are provided in the vehicle interior, through ducts that form air passages, respectively.

Accordingly, since the air-mix door 36 adjusts the ratio of the flow rate of air, which passes through the heater core 34 and the indoor condenser 12, to the flow rate of air, which passes through the cold air bypass passage 35, the temperature of the air-conditioning air mixed in the mixing space is adjusted. As a result, the temperature of the air-conditioning air, which is blown into the vehicle interior through each of the air outlets, is adjusted.

That is, the air-mix door 36 forms a temperature adjusting device for adjusting the temperature of the air-conditioning air that is blown into the vehicle interior. The air-mix door 36 is driven by an electric actuator for driving the air-mix door, and the operation of the air-mix door 36 is controlled by a control signal that is output from the air-conditioning control device.

Further, a face door that adjusts the area of the face opening hole, a foot door that adjusts the area of the foot opening hole, and a defroster door that adjusts the area of the defroster opening hole (all of them are not shown) are disposed on the upstream sides of the face opening hole, the foot opening hole, and the defroster opening hole in the flow of blown air, respectively.

The face door, the foot door, and the defroster door form an air outlet mode switching device for switching an air outlet mode, are connected to an electric actuator, which drives air outlet mode doors, through a link mechanism or the like, and are rotated while interlocking with one another. The operation of this electric actuator is also controlled by a control signal that is output from the air-conditioning control device.

Specifically, examples of the air outlet mode that is switched by the air outlet mode switching device include: a face mode that fully opens the face air outlet to blow air from the face air outlet toward the upper body of an occupant present in the vehicle interior; a bi-level mode that opens both the face air outlet and the foot air outlet to blow air toward the upper body and feet of an occupant present in the vehicle interior; a foot mode that fully opens the foot air outlet and opens the defroster air outlet by a small opening to mainly blow air from the foot air outlet; and a foot-defroster mode that opens the foot air outlet and the defroster air outlet by substantially the same opening to blow air from both the foot air outlet and the defroster air outlet.

In addition, a defroster mode, which fully opens the defroster air outlet to blow air to the inner surface of a windshield of a vehicle from the defroster air outlet when an occupant manually operates a blow-out mode switching switch provided on an operation panel, can be used.

Next, an electric controller of the present embodiment will be described. The air-conditioning control device includes a well-known microcomputer that includes a CPU, a ROM, a RAM, and the like, and a peripheral circuit thereof. Further, the air-conditioning control device controls the operations of various air-conditioning control instruments, such as the compressor 11, the first expansion valve 15a, the second expansion valve 15b, the on-off valve 20, the pilot on-off valve 22, the blower 32, and the electric actuators, connected to an output side of the air-conditioning control device by performing various kinds of calculation and processing on the basis of an air-conditioning control program stored in the ROM.

Furthermore, detection signals of an air-conditioning control sensor group, such as an inside air sensor, an outside air sensor, a solar radiation sensor, a discharge temperature sensor, a discharge pressure sensor, an evaporator temperature sensor, a blown air temperature sensor, and an outdoor heat exchanger temperature sensor, are input to an input side of the air-conditioning control device. The inside air sensor serves as an inside air-temperature detecting device for detecting the temperature Tr in the vehicle interior (the temperature of inside air). The outside air sensor serves as an outside air-temperature detecting device for detecting the temperature Tam outside a vehicle (the temperature of outside air). The solar radiation sensor serves as a solar radiation detecting device for detecting the amount As of solar radiation that is applied to the vehicle interior. The discharge temperature sensor detects discharged refrigerant temperature Td of a refrigerant that is discharged from the compressor 11. The discharge pressure sensor detects pressure Pd of a refrigerant that is discharged from the compressor 11 (high-pressure side refrigerant pressure). The evaporator temperature sensor detects refrigerant evaporation temperature (evaporator temperature) Tefin of the indoor evaporator 18. The blown air temperature sensor detects blown air temperature TAV of blown air that is blown into the vehicle interior from the mixing space. The outdoor heat exchanger temperature sensor detects temperature Ts of the outdoor heat exchanger 16.

For example, the pressure Pd of a discharged refrigerant of the present embodiment becomes the high-pressure side refrigerant pressure of a cycle, which reaches the inlet side of the second expansion valve 15b from a refrigerant discharge port of the compressor 11, in the cooling mode; and becomes the high-pressure side refrigerant pressure of a cycle, which reaches the inlet side of the first expansion valve 15a from a refrigerant discharge port of the compressor 11, in the heating mode and the like. Further, the blown air temperature sensor, which detects the blown air temperature TAV, is provided in the present embodiment, but a value calculated on the basis of the evaporator temperature Tefin, the discharged refrigerant temperature Td, or the like may be employed as the blown air temperature TAV.

Furthermore, operation signals output from various air-conditioning operation switches, which are provided on the operation panel disposed near the dashboard positioned at the front portion of the vehicle interior, are input to the input side of the air-conditioning control device. Specifically, examples of the various air-conditioning operation switches, which are provided on the operation panel, include: an automatic switch that is used to set or cancel an automatic control operation of the vehicle air conditioning system 1; a cooling switch (A/C switch) that is used to perform cooling in the vehicle interior; an air volume setting switch that is used to manually set the air volume of air that is blown from the blower 32; a temperature setting switch as a target temperature setting device for setting a target temperature Tset in the vehicle interior; and a blow-out mode switching switch that is used to manually set the blow-out mode.

The air-conditioning control device is formed integrally with a control device that controls various air-conditioning components connected to the output side of the air-conditioning control device. However, a structure (hardware and software), which controls the operations of the respective air-conditioning components, forms a control device for controlling the operations of the respective air-conditioning components.

For example, in the present embodiment, a structure (hardware and software) for controlling the operation of the compressor 11 forms a discharge capacity control device, and a structure (hardware and software) for controlling the operations of the second expansion valve 15b, the on-off valve 20, and the pilot on-off valve 22, which form the refrigerant circuit switching devices, forms a refrigerant circuit control device. Of course, the discharge capacity control device, the refrigerant circuit control device and the like may be formed of air-conditioning control devices that are separate from the air-conditioning control device.

Next, the operation of the vehicle air conditioning system 1 of the present embodiment having the above-mentioned structure will be described. As described above, the operations of the cooling mode, the heating mode, and the first and second dehumidification heating modes can be switched in the vehicle air conditioning system 1 of the present embodiment. The switching of these respective operation modes is performed by the execution of the air-conditioning control program. This air-conditioning control program is executed when the automatic switch of the operation panel is turned on (ON).

More specifically, the detection signals of the above-mentioned air-conditioning control sensor group and the operation signals output from the various air-conditioning operation switches are read during a main routine of the air-conditioning control program. Further, a target blowing temperature TAO, which is the target temperature of air blown into the vehicle interior, is calculated from the following equation F1 on the basis of the values of the read detection signals and the operation signals.

$$TAO = Kset \times Tset - Kr \times Tr - Kam \times Tam - Ks \times As + C \quad (F1)$$

Tset denotes a preset temperature in the vehicle interior that is set by the temperature setting switch, Tr denotes the temperature in the vehicle interior (the temperature of inside air) that is detected by the inside air sensor, Tam denotes the temperature of outside air that is detected by the outside air sensor, and As denotes solar radiation that is detected by the solar radiation sensor. Kset, Kr, Kam, and Ks denote control gains, and C denotes a constant for correction.

Moreover, when the cooling switch of the operation panel is turned on and the target blowing temperature TAO is lower than a predetermined cooling reference temperature α, the operation of the cooling mode is performed. Further, when the cooling switch is turned on, the target blowing temperature TAO is equal to or higher than the cooling reference temperature α, and the ambient temperature Tam is higher than a dehumidification heating reference temperature β, the operation of the first dehumidification heating mode is performed.

On the other hand, in a state where the cooling switch is turned on, when the target blowing temperature TAO is equal to or higher than the cooling reference temperature α, and when the outside air temperature Tam is equal to or lower than the dehumidification heating reference temperature β, the operation of the second dehumidification heating mode is performed. Further, when the cooling switch is not turned on, the operation of the heating mode is performed. The operations of the respective operation modes will be described.

(a) Cooling Mode

In the cooling mode, the air-conditioning control device closes the on-off valve 20 and the pilot on-off valve 22 and makes the throttle opening of the first expansion valve 15a be a full opening to make the second expansion valve 15b be in a throttle state in which a depressurizing action is exerted.

Accordingly, a vapor compression type refrigeration cycle, which circulates a refrigerant in the order of the compressor 11, the indoor condenser 12, (the first expansion valve 15a), the outdoor heat exchanger 16, (the check valve 17), the second expansion valve 15b, the indoor evaporator 18, the evaporating pressure regulating valve 19, the accumulator 21, and the compressor 11 as shown by the white arrow of FIG. 1, is formed in the cooling mode. Moreover, the air-conditioning control device determines the operating states of the various air-conditioning control instruments (control signals to be output to the various control instruments) on the basis of the target blowing temperature TAO, the detection signals of the air-conditioning control sensor group, and the like based on the structure of this refrigerant circuit.

For example, the refrigerant discharge capacity of the compressor 11, that is, a control signal to be output to the electric motor of the compressor 11 is determined as described below. First, a target evaporator blowing temperature TEO of the indoor evaporator 18 is determined on the basis of the target blowing temperature TAO with reference to a control map that is stored in the air-conditioning control device in advance.

Further, the control signal to be output to the electric motor of the compressor 11 is determined by using a feedback control method on the basis of a deviation between the target evaporator blowing temperature TEO and the evaporator temperature Tefin detected by the evaporator temperature sensor so that the evaporator temperature Tefin approaches the target evaporator blowing temperature TEO.

Furthermore, a control signal to be output to the second expansion valve 15b is determined so that the degree of subcooling of a refrigerant flowing into the second expansion valve 15b approaches a target degree of subcooling, which is determined so that the coefficient of performance (COP) of the cycle has substantially the maximum value.

Moreover, a control signal to be output to the electric actuator of the air-mix door 36 is determined so that the air-mix door 36 closes the air passage formed on a side where the heater core 34 and the indoor condenser 12 are disposed and all of the blown air having passed through the indoor evaporator 18 passes through the cold air bypass passage 35.

Further, the control signals and the like that are determined as described above are output to the various air-conditioning control instruments. After that, until the stop of the operation of the vehicle air conditioning system is required by the operation panel, a control routine, which includes the reading of the above-mentioned detection signals and the above-mentioned operation signals, the calculation of the target blowing temperature TAO, the determination of the operating states of the various air-conditioning control instruments, and the output of the control voltages and the control signals, is repeated every predetermined control period. The repetition of this control routine is also performed in the same manner at the time of other operation modes.

Accordingly, a high-pressure refrigerant discharged from the compressor 11 flows into the indoor condenser 12 in the refrigeration cycle device 10 at the time of the cooling mode. Since the air-mix door 36 closes the air passage formed on the side where the heater core 34 and the indoor condenser 12 are disposed at this time, the refrigerant flowing into the indoor condenser 12 hardly exchanges heat between itself and blown air and flows out of the indoor condenser 12.

The refrigerant flowing out of the indoor condenser 12 flows into the first expansion valve 15a through the first refrigerant passage 14a. Since the first expansion valve 15a is in a full-open state at this time, the refrigerant flowing out of the indoor condenser 12 flows into the outdoor heat exchanger 16 without being depressurized by the first expansion valve 15a. Further, the refrigerant flowing into the outdoor heat exchanger 16 radiates heat to the outside air that is blown from the blower fan at the outdoor heat exchanger 16.

Since the on-off valve 20 is closed, the refrigerant flowing out of the outdoor heat exchanger 16 flows into the third refrigerant passage 14c through the second three-way joint 13b and is depressurized by the second expansion valve 15b until becoming a low-pressure refrigerant. The low-pressure refrigerant depressurized by the second expansion valve 15b flows into the indoor evaporator 18 and evaporates by absorbing heat from the air that is blown from the blower 32. Accordingly, the blown air is cooled.

The refrigerant flowing out of the indoor evaporator 18 flows into the accumulator 21 through the evaporating pressure regulating valve 19, and is separated into a gas-phase refrigerant and a liquid-phase refrigerant. Further, the gas-phase refrigerant, which is separated by the accumulator 21, is sucked from the suction side of the compressor 11 and is compressed by the compressor 11 again.

Accordingly, cooling in the vehicle interior by blowing air, which is cooled at the indoor evaporator 18, into the vehicle interior in the cooling mode can be achieved.

(b) Heating Mode

In the heating mode, the air-conditioning control device opens the on-off valve 20, closes the pilot on-off valve 22, and makes the first expansion valve 15a be in a throttle state, in which a depressurizing action is exerted, to make the second expansion valve 15b be in a fully closed state.

Accordingly, a vapor compression type refrigeration cycle, which circulates a refrigerant in the order of the compressor 11, the indoor condenser 12, the first expansion valve 15a, the outdoor heat exchanger 16, (the on-off valve 20), the accumulator 21, and the compressor 11 as shown by the black arrow of FIG. 1, is formed in the heating mode. Moreover, the air-conditioning control device determines the operating states of the various air-conditioning control instruments (control signals to be output to the various control instruments) on the basis of the target blowing temperature TAO, the detection signals of the sensor group, and the like based on the structure of this refrigerant circuit.

For example, the refrigerant discharge capacity of the compressor 11, that is, a control signal to be output to the electric motor of the compressor 11 is determined as described below. First, a target condenser temperature TCO of the indoor condenser 12 is determined on the basis of the target blowing temperature TAO with reference to a control map that is stored in the air-conditioning control device in advance.

Further, the control signal to be output to the electric motor of the compressor 11 is determined by using a feedback control method on the basis of a deviation between the target condenser temperature TCO and the discharged refrigerant temperature Td detected by the discharge temperature sensor so that the discharged refrigerant temperature Td approaches the target condenser temperature TCO.

Furthermore, a control signal to be output to the first expansion valve 15a is determined so that the degree of subcooling of a refrigerant flowing into the first expansion valve 15a approaches a target degree of subcooling, which is determined so that the coefficient of performance (COP) of the cycle has substantially the maximum value.

Moreover, a control signal to be output to the electric actuator of the air-mix door 36 is determined so that the air-mix door 36 closes the cold air bypass passage 35 and the amount of all the blown air having passed through the indoor evaporator 18 passes through the air passage formed on a side where the heater core 34 and the indoor condenser 12 are disposed.

Accordingly, a high-pressure refrigerant discharged from the compressor 11 flows into the indoor condenser 12 in the refrigeration cycle device 10 at the time of the heating mode. The refrigerant flowing into the indoor condenser 12 radiates heat by exchanging heat between itself and air that has been blown from the blower 32 and passed through the indoor evaporator 18. Accordingly, the blown air is heated.

The refrigerant flowing out of the indoor condenser 12 flows into the first expansion valve 15a through the first refrigerant passage 14a, and is depressurized at the first expansion valve 15a until becoming a low-pressure refrigerant. Further, the low-pressure refrigerant depressurized by the first expansion valve 15a flows into the outdoor heat exchanger 16, and absorbs heat from the outside air that is blown from the blower.

Since the on-off valve 20 is opened and the second expansion valve 15b is in the fully closed state, the refrigerant flowing out of the outdoor heat exchanger 16 flows into the accumulator 21 through the fourth refrigerant passage 14d and is separated into a gas-phase refrigerant and a liquid-phase refrigerant. Further, the gas-phase refrigerant, which is separated by the accumulator 21, is sucked from the suction side of the compressor 11 and is compressed by the compressor 11 again.

Accordingly, heating in the vehicle interior by blowing air, which is heated at the indoor condenser 12, into the vehicle interior in the heating mode can be achieved. Of course, blown air is also heated at the heater core 34 during the operation of the engine.

(c) First Dehumidification Heating Mode

In the first dehumidification heating mode, the air-conditioning control device closes the on-off valve 20 and the pilot on-off valve 22 and makes both the first expansion valve 15a and the second expansion valve 15b be in a throttle state in which a depressurizing action is exerted.

Accordingly, a vapor compression type refrigeration cycle, which circulates a refrigerant in the order of the compressor 11, the indoor condenser 12, the first expansion valve 15a, the outdoor heat exchanger 16, the second expansion valve 15b, the indoor evaporator 18, the evaporating pressure regulating valve 19, the accumulator 21, and the compressor 11 as shown by the diagonally hatched arrow of FIG. 1, is formed in the first dehumidification heating mode as in the cooling mode.

In other words, in the first dehumidification heating mode, the refrigeration cycle device is switched to a refrigerant circuit that allows the refrigerant flowing out of the indoor condenser 12 to flow in the order of the outdoor heat exchanger 16 and the indoor evaporator 18 in series. Moreover, the air-conditioning control device determines the operating states of the various control instruments connected to the air-conditioning control device (control signals to be output to the various control instruments) on the basis of the target blowing temperature TAO the detection signals of the sensor group, and the like based on the structure of this refrigerant circuit.

For example, a control signal to be output to the electric motor of the compressor 11 is determined in the same manner as the cooling mode. Further, a control signal to be output to the electric actuator of the air-mix door 36 is determined so that the air-mix door 36 closes the cold air bypass passage 35 and all of the blown air having passed through the indoor evaporator 18 passes through the air passage formed on a side where the heater core 34 and the indoor condenser 12 are disposed.

Furthermore, the air-conditioning control device changes control signals, which are to be output to the first expansion valve 15a and the second expansion valve 15b, according to the target blowing temperature TAO. Specifically, the air-conditioning control device reduces the throttle opening of the first expansion valve 15a and increases the throttle opening of the second expansion valve 15b in association with a rise in the target blowing temperature TAO that is the target temperature of air blown into the vehicle interior. Accordingly, the air-conditioning control device performs four modes, that is, first to fourth modes in the first dehumidification heating mode.

(c-1) First Mode

The first mode is performed when the target blowing temperature TAO is equal to or higher than the cooling reference temperature α and equal to or lower than a predetermined first reference temperature at the time of the first dehumidification heating mode.

In the first mode, the air-conditioning control device makes the throttle opening of the first expansion valve 15a be in a full-open state and makes the second expansion valve 15b be in a throttle state. Accordingly, the cycle configuration of the first mode is exactly the same as that of the cooling mode, but the air-mix door 36 makes the air passage, which is formed on a side where the heater core 34 and the indoor condenser 12 are disposed, be in a full-open state. Therefore, the state of a refrigerant circulating in the cycle changes as shown in the Mollier diagram of FIG. 3.

Figure 3:
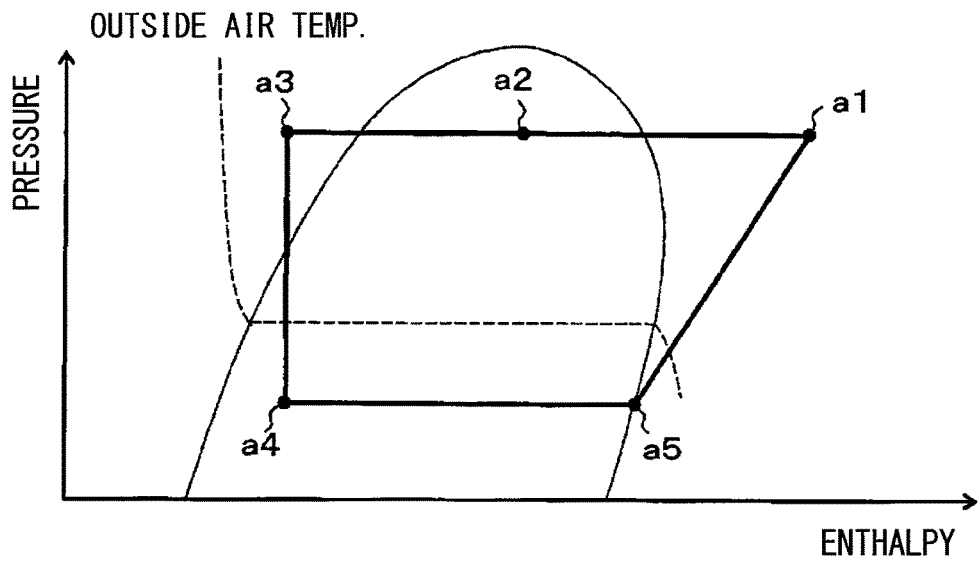
FIG. 3 is a Mollier diagram showing a state of a refrigerant in a first dehumidification heating mode (first mode) of the refrigeration cycle device according to the first embodiment.

That is, as shown in FIG. 3, the high-pressure refrigerant (point a1) discharged from the compressor 11 flows into the indoor condenser 12 and radiates heat by exchanging heat between itself and blown air that has been cooled and dehumidified by the indoor evaporator 18 (point a1→point a2 in FIG. 3). Accordingly, the blown air is heated. The refrigerant flowing out of the indoor condenser 12 flows into the first expansion valve 15a. Since the first expansion valve 15a is in a full-open state at this time, the refrigerant flowing out of the indoor condenser 12 flows into the outdoor heat exchanger 16 without being depressurized by the first expansion valve 15*a*.

Further, the refrigerant flowing into the outdoor heat exchanger 16 radiates heat by exchanging heat between itself and outside air, which is blown from the blower fan, at the outdoor heat exchanger 16 (point a2→point a3 in FIG. 3). Since the on-off valve 20 is closed, the refrigerant flowing out of the outdoor heat exchanger 16 flows into the third refrigerant passage 14*c* through the second three-way joint 13*b* and is depressurized by the second expansion valve 15*b* until becoming a low-pressure refrigerant (point a3→point a4 in FIG. 3).

The low-pressure refrigerant depressurized by the second expansion valve 15*b* flows into the indoor evaporator 18 and evaporates by absorbing heat from the air that is blown from the blower 32 (point a4→point a5 in FIG. 3). Accordingly, the blown air is cooled. Further, a refrigerant flowing out of the other refrigerant inflow-outlet 20*b* of the indoor evaporator 18 flows to the evaporating pressure regulating valve 19, the accumulator 21, and the suction side of the compressor 11 and is compressed by the compressor 11 again as in the cooling mode.

Accordingly, at the time of the first mode, blown air, which has been cooled and dehumidified by the indoor evaporator 18, can be heated in the indoor condenser 12 to be blown into the vehicle interior. Therefore, dehumidification heating in the vehicle interior can be achieved.

(c-2) Second Mode

The second mode is performed when the target blowing temperature TAO is higher than the first reference temperature and equal to or lower than a predetermined second reference temperature at the time of the first dehumidification heating mode. In the second mode, the air-conditioning control device makes the first expansion valve 15*a* be in a throttle state and increases the throttle opening of the second expansion valve 15*b* further than at the time of the first mode. Accordingly, the state of a refrigerant circulating in the cycle changes in the second mode as shown in the Mollier diagram of FIG. 4.

Figure 4:
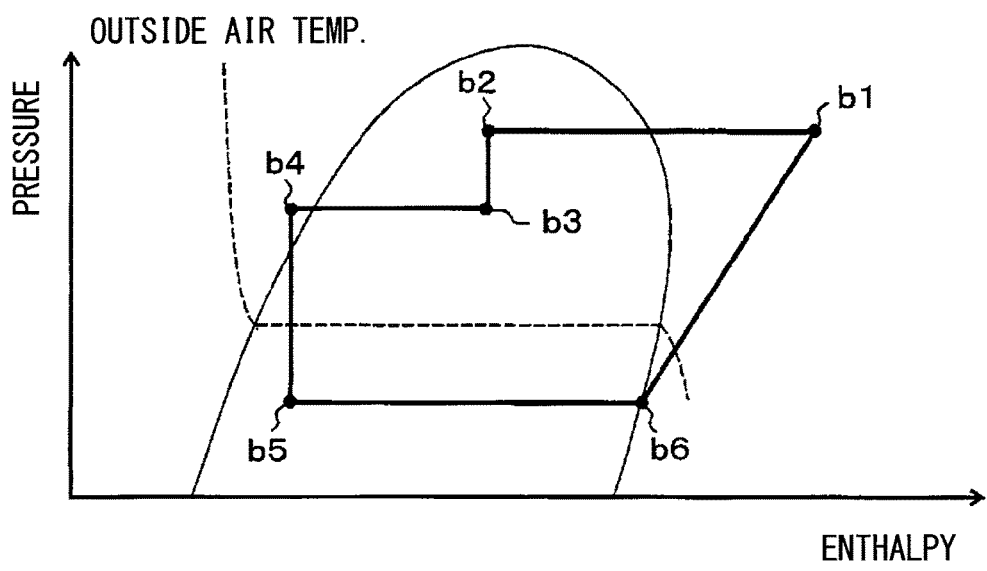
FIG. 4 is a Mollier diagram showing a state of a refrigerant in a first dehumidification heating mode (second mode) of the refrigeration cycle device according to the first embodiment.

That is, as shown in FIG. 4, the high-pressure refrigerant (point b1) discharged from the compressor 11 flows into the indoor condenser 12 and radiates heat by exchanging heat between itself and blown air that has been cooled and dehumidified by the indoor evaporator 18 (point b1→point b2 in FIG. 4). Accordingly, the blown air is heated. The refrigerant flowing out of the indoor condenser 12 flows into the first expansion valve 15*a*, and is depressurized until becoming an intermediate-pressure refrigerant (point b2→point b3 in FIG. 4).

Further, the intermediate-pressure refrigerant depressurized at the first expansion valve 15*a* flows into the outdoor heat exchanger 16 and radiates heat by exchanging heat between itself and the outside air that is blown from the blower fan (point b3→point b4 in FIG. 4). The refrigerant flowing out of the outdoor heat exchanger 16 is depressurized by the second expansion valve 15*b* until becoming a low-pressure refrigerant (point b4→point b5 in FIG. 4).

The low-pressure refrigerant depressurized by the second expansion valve 15*b* flows into the indoor evaporator 18 and evaporates by absorbing heat from the air that is blown from the blower 32 (point b5→point b6 in FIG. 4). Accordingly, the blown air is cooled. Further, a refrigerant flowing out of the other refrigerant inflow-outlet 20*b* of the indoor evaporator 18 flows to the evaporating pressure regulating valve 19, the accumulator 21, and the suction side of the compressor 11 and is compressed by the compressor 11 again as in the cooling mode.

Accordingly, at the time of the second mode, as in the first mode, blown air, which has been cooled and dehumidified by the indoor evaporator 18, can be heated with the indoor condenser 12 to be blown into the vehicle interior. Therefore, dehumidification heating in the vehicle interior can be achieved.

In this case, the first expansion valve 15*a* is in a throttle state in the second mode. Accordingly, the temperature of the refrigerant flowing into the outdoor heat exchanger 16 can be lowered further than in the first mode. Therefore, the amount of heat, which is radiated from the refrigerant of the outdoor heat exchanger 16, can be reduced by reducing a difference between the temperature of the refrigerant of the outdoor heat exchanger 16 and the temperature of outside air.

As a result, since the pressure of the refrigerant of the indoor condenser 12 can be increased without increasing the flow rate of a refrigerant circulating in the cycle more than that of the first mode, the temperature of air blown from the indoor condenser 12 can be raised further than in the first mode.

(c-3) Third Mode

The third mode is performed when the target blowing temperature TAO is higher than the second reference temperature and equal to or lower than a predetermined third reference temperature at the time of the first dehumidification heating mode. In the third mode, the air-conditioning control device reduces the throttle opening of the first expansion valve 15*a* further than at the time of the second mode and increases the throttle opening of the second expansion valve 15*b* in further than at the time of the second mode. Accordingly, the state of a refrigerant circulating in the cycle changes in the third mode as shown in the Mollier diagram of FIG. 5.

Figure 5:
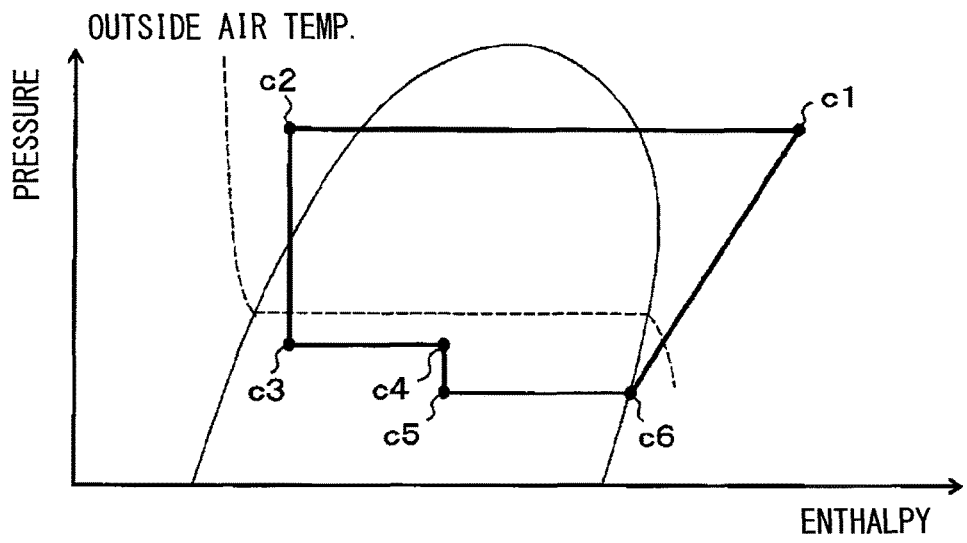
FIG. 5 is a Mollier diagram showing a state of a refrigerant in a first dehumidification heating mode (third mode) of the refrigeration cycle device according to the first embodiment.

That is, as shown in FIG. 5, the high-pressure refrigerant (point c1) discharged from the compressor 11 flows into the indoor condenser 12 and radiates heat by exchanging heat between itself and blown air that has been cooled and dehumidified by the indoor evaporator 18 (point c1→point c2 in FIG. 5). Accordingly, the blown air is heated. The refrigerant flowing out of the indoor condenser 12 flows into the first expansion valve 15*a*, and is depressurized until becoming an intermediate-pressure refrigerant (point c2→point c3 in FIG. 5).

Further, the intermediate-pressure refrigerant depressurized by the first expansion valve 15*a* flows into the outdoor heat exchanger 16 and absorbs heat from the outside air that is blown from the blower fan (point c3→point c4 in FIG. 5). The refrigerant flowing out of the outdoor heat exchanger 16 is depressurized by the second expansion valve 15*b* until becoming a low-pressure refrigerant (point c4 point c5 in FIG. 5).

The low-pressure refrigerant depressurized by the second expansion valve 15*b* flows into the indoor evaporator 18 and evaporates by absorbing heat from the air that is blown from the blower 32 (point c5→point c6 in FIG. 5). Accordingly, the blown air is cooled. Further, a refrigerant flowing out of the other refrigerant inflow-outlet 20*b* of the indoor evaporator 18 flows to the evaporating pressure regulating valve 19, the accumulator 21, and the suction side of the compressor 11 and is compressed by the compressor 11 again as in the cooling mode.

Accordingly, at the time of the third mode, as in the first and second modes, blown air, which has been cooled and dehumidified by the indoor evaporator 18, can be heated with the indoor condenser 12 to be blown into the vehicle interior. Therefore, dehumidification heating in the vehicle interior can be achieved.

In this case, the throttle opening of the first expansion valve 15a is reduced in the third mode, so that the outdoor heat exchanger 16 is made to function as an evaporator. Accordingly, the temperature of air blown from the indoor condenser 12 can be raised further than in the second mode.

As a result, since the density of a refrigerant sucked in from the compressor 11 can be increased further than in the second mode, the pressure of the refrigerant of the indoor condenser 12 can be increased without increasing the rotational speed (refrigerant discharge capacity) of the compressor 11. Accordingly, the temperature of air blown from the indoor condenser 12 further than in the second mode can be raised.

(c-4) Fourth Mode

The fourth mode is performed when the target blowing temperature TAO is higher than the third reference temperature at the time of the first dehumidification heating mode. In the fourth mode, the air-conditioning control device reduces the throttle opening of the first expansion valve 15a further than in the third mode and makes the second expansion valve 15b be in a full-open state. Accordingly, the state of a refrigerant circulating in the cycle changes in the fourth mode as shown in the Mollier diagram of FIG. 6.

Figure 6:
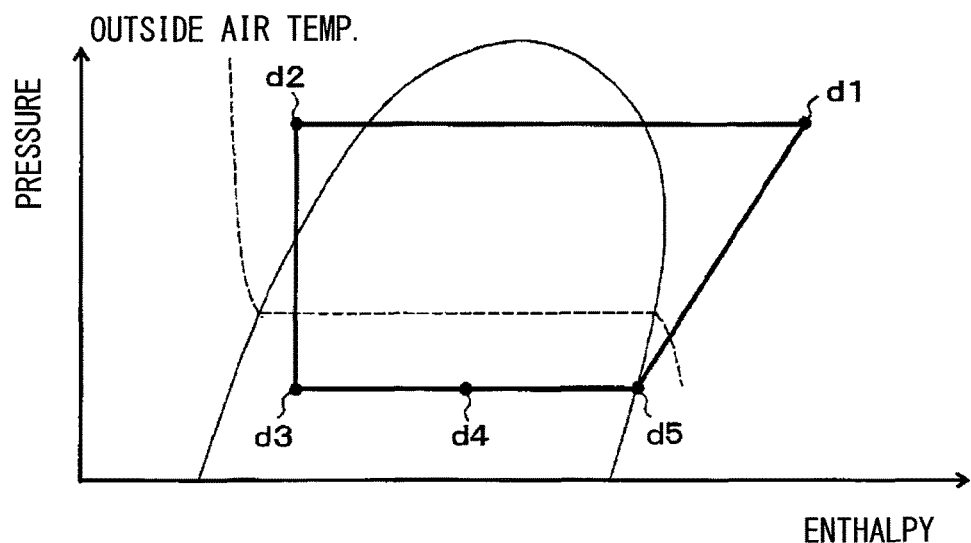
FIG. 6 is a Mollier diagram showing a state of a refrigerant in a first dehumidification heating mode (fourth mode) of the refrigeration cycle device according to the first embodiment.

That is, as shown in FIG. 6, the high-pressure refrigerant (point d1) discharged from the compressor 11 flows into the indoor condenser 12 and radiates heat by exchanging heat between itself and blown air that has been cooled and dehumidified by the indoor evaporator 18 (point d1→point d2 in FIG. 6). Accordingly, the blown air is heated. The refrigerant flowing out of the indoor condenser 12 flows into the first expansion valve 15a, and is depressurized until becoming a low-pressure refrigerant (point d2→point d3 in FIG. 6).

Further, the low-pressure refrigerant depressurized by the first expansion valve 15a flows into the outdoor heat exchanger 16 and absorbs heat from the outside air that is blown from the blower fan (point d3→point d4 in FIG. 6). The refrigerant flowing out of the outdoor heat exchanger 16 flows into the indoor evaporator 18 through the second expansion valve 15b. In this case, the second expansion valve 15b is in a full-open state in the fourth mode. Accordingly, the refrigerant flowing out of the outdoor heat exchanger 16 flows into the indoor evaporator 18 without being depressurized by the second expansion valve 15b.

The low-pressure refrigerant flowing into the indoor evaporator 18 evaporates by absorbing heat from the air that is blown from the blower 32 (point d4 point d5 in FIG. 6). Accordingly, the blown air is cooled. Further, the refrigerant flowing out of the indoor evaporator 18 flows to the evaporating pressure regulating valve 19, the accumulator 21, and the suction side of the compressor 11 and is compressed by the compressor 11 again as in the cooling mode.

Accordingly, at the time of the fourth mode, as in the first to third modes, blown air, which has been cooled and dehumidified by the indoor evaporator 18, can be heated with the indoor condenser 12 to be blown into the vehicle interior. Therefore, dehumidification heating in the vehicle interior can be achieved.

In this case, the outdoor heat exchanger 16 is made to function as an evaporator in the fourth mode as in the third mode and the throttle opening of the first expansion valve 15a is reduced further than in the third mode. Accordingly, the refrigerant evaporation temperature of the outdoor heat exchanger 16 can be lowered. Therefore, the amount of heat, which is absorbed by the refrigerant of the outdoor heat exchanger 16, can be increased by increasing a difference between the temperature of the refrigerant of the outdoor heat exchanger 16 and the temperature of outside air further than in the third mode.

As a result, since the density of the refrigerant sucked in from the compressor 11 can be increased further than in the third mode, the pressure of the refrigerant of the indoor condenser 12 can be increased without increasing the rotational speed (refrigerant discharge capacity) of the compressor 11. Accordingly, the temperature of air blown from the indoor condenser 12 can be raised further than in the third mode.

The temperature of the blow-out air, which is blown into the vehicle interior, can be adjusted over a wide range from a low-temperature region to a high-temperature region by changing the throttle openings of the first and second expansion valves 15a and 15b according to the target blowing temperature TAO and making the outdoor heat exchanger 16 function as a radiator or an evaporator in the first dehumidification heating mode as described above.

(d) Second Dehumidification Heating Mode

In the second dehumidification heating mode, the air-conditioning control device opens the on-off valve 20 and the pilot on-off valve 22 and makes both the first expansion valve 15a and the second expansion valve 15b be in a throttle state. In the second dehumidification heating mode, the pilot on-off valve 22 opens the second refrigerant passage 14b that is a bypass passage, unlike the other operation modes.

Accordingly, a vapor compression type refrigeration cycle, which circulates a refrigerant in the order of the compressor 11, the indoor condenser 12, the first expansion valve 15a, the outdoor heat exchanger 16, (the on-off valve 20), the accumulator 21, and the compressor 11 and circulates a refrigerant in the order of the compressor 11, the indoor condenser 12, (the pilot on-off valve 22), the second expansion valve 15b, the indoor evaporator 18, the evaporating pressure regulating valve 19, the accumulator 21, and the compressor 11 as shown by the shaded-hatched arrow of FIG. 1, is formed in the second dehumidification heating mode.

In other words, in the second dehumidification heating mode, the refrigeration cycle device is switched to a refrigerant circuit that allows the refrigerant flowing out of the indoor condenser 12 to flow in the order of the first expansion valve 15a, the outdoor heat exchanger 16, and the compressor 11 and to flow in the order of the second expansion valve 15b, the indoor evaporator 18, the evaporating pressure regulating valve 19, and the compressor 11 in parallel. Moreover, the air-conditioning control device determines the operating states of the various control instruments connected to the air-conditioning control device (control signals to be output to the various control instruments) on the basis of the target blowing temperature TAO, the detection signals of the sensor group, and the like based on the structure of this refrigerant circuit.

For example, a control signal to be output to the electric motor of the compressor 11 is determined in the same manner as the cooling mode. Further, a control signal to be output to the electric actuator of the air-mix door 36 is determined so that the air-mix door 36 closes the cold air bypass passage 35 and all of the blown air having passed through the indoor evaporator 18 passes through the air passage formed on a side where the heater core 34 and the indoor condenser 12 are disposed.

Furthermore, control signals, which are to be output to the first expansion valve 15a and the second expansion valve 15b, are determined so that the throttle openings of the first and second expansion valves 15a and 15b become a predetermined opening for the second dehumidification heating mode. More specifically, the control signals are determined so that the amount of the refrigerant depressurized by the first expansion valve 15a is the sum of the amount of the refrigerant depressurized at the second expansion valve 15b and the amount of the refrigerant depressurized at the evaporating pressure regulating valve 19.

Figure 7:
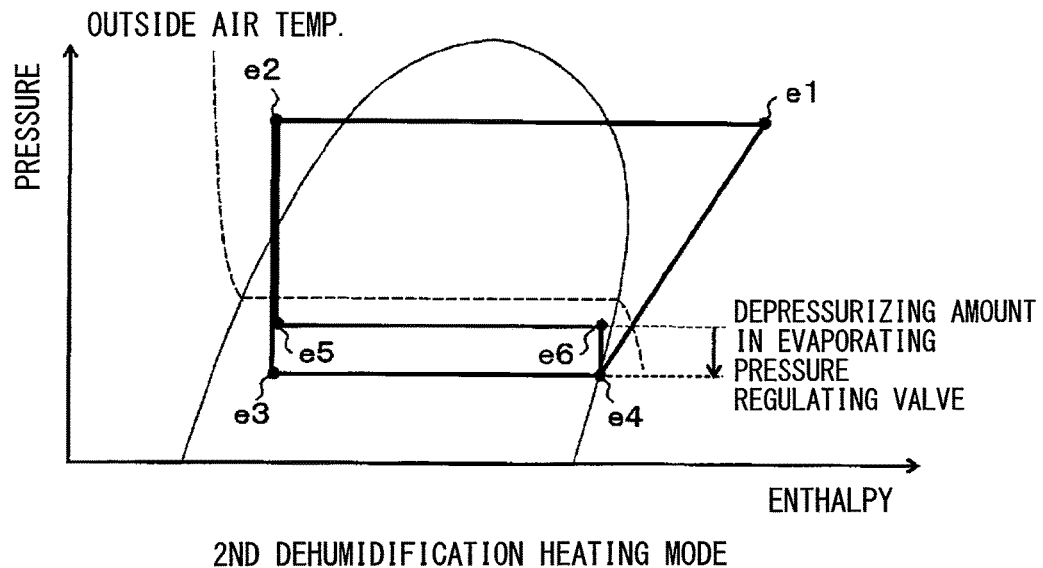
FIG. 7 is a Mollier diagram showing a state of a refrigerant in a second dehumidification heating mode of the refrigeration cycle device according to the first embodiment.

Accordingly, in the refrigeration cycle device 10 at the time of the second dehumidification heating mode, as shown in the Mollier diagram of FIG. 7, the high-pressure refrigerant (point e1) discharged from the compressor 11 flows into the indoor condenser 12 and radiates heat by exchanging heat between itself and blown air that has been cooled and dehumidified by the indoor evaporator 18 (point e1→point e2 in FIG. 7). Accordingly, the blown air is heated.

Since the pilot on-off valve 22 is opened, the flow of the refrigerant flowing out of the indoor condenser 12 is branched at the first three-way joint 13a. A part of the refrigerant branched at the first three-way joint 13a flows into the first refrigerant passage 14a, and is depressurized at the first expansion valve 15a until becoming a low-pressure refrigerant (point e2→point e3 in FIG. 7). The low-pressure refrigerant depressurized by the first expansion valve 15a flows into the outdoor heat exchanger 16 and absorbs heat from the outside air that is blown from the blower fan (point e3→point e4 in FIG. 7).

The other part of the refrigerant branched at the first three-way joint 13a flows into the second expansion valve 15b through the pilot on-off valve 22 and the third three-way joint 13c and is depressurized until becoming a low-pressure refrigerant (point e2→point e5 in FIG. 7). Further, the low-pressure refrigerant depressurized by the second expansion valve 15b flows into the indoor evaporator 18, and evaporates by absorbing heat from the air that is blown from the blower 32 (point e5→point e6 in FIG. 7). Accordingly, the blown air is cooled.

Moreover, the refrigerant flowing out of the indoor evaporator 18 is depressurized by the evaporating pressure regulating valve 19 (point e6→point e4 in FIG. 7), so that the pressure of the refrigerant flowing out of the indoor evaporator 18 becomes the same as the pressure of the refrigerant flowing out of the outdoor heat exchanger 16. The refrigerant flowing out of the evaporating pressure regulating valve 19 flows into the fourth three-way joint 13d, and joins the refrigerant flowing out of the outdoor heat exchanger 16. Further, the joining refrigerant flows to the accumulator 21 and the suction side of the compressor 11, and is compressed by the compressor 11 again.

Accordingly, at the time of the second dehumidification heating mode, as in the first dehumidification heating mode, blown air, which has been cooled and dehumidified by the indoor evaporator 18, can be heated with the indoor condenser 12 and to blow the air into the vehicle interior. Therefore, dehumidification heating in the vehicle interior can be achieved.

In this case, the refrigerant evaporation temperature of the outdoor heat exchanger 16 can be lower than the refrigerant evaporation temperature of the indoor evaporator 18 in the second dehumidification heating mode. Accordingly, the amount of heat, which is absorbed by the refrigerant of the outdoor heat exchanger 16, can be increased by increasing a difference between the temperature of the refrigerant of the outdoor heat exchanger 16 and the temperature of outside air further than in the first dehumidification heating mode. As a result, the heating capacity of blown air in the indoor condenser 12 can be increased further than in the first dehumidification heating mode.

As described above, according to the vehicle air conditioning system 1 of the present embodiment, appropriate air conditioning in the vehicle interior can be achieved by switching the operations of the cooling mode, the heating mode, the first dehumidification heating mode, and the second dehumidification heating mode. In addition, the temperature of air, which is blown into the vehicle interior, in the order of the heating mode, the second dehumidification heating mode, the first dehumidification heating mode, and the cooling mode as shown in FIG. 8 in the refrigeration cycle device 10 of the present embodiment can be lowered.

Accordingly, in order to raise the temperature of air, which is blown into the vehicle interior, further than in the first dehumidification heating mode, it is necessary to switch the refrigeration cycle device to the refrigerant circuit for the second dehumidification heating mode from the refrigerant circuit for the first dehumidification heating mode. Moreover, in order to lower the temperature of air, which is blown into the vehicle interior, further than in the heating mode, it is necessary to switch the refrigeration cycle device to the refrigerant circuit for the second dehumidification heating mode from the refrigerant circuit for the heating mode.

That is, when the refrigeration cycle device 10 of the present embodiment is switched to the refrigerant circuit for the second dehumidification heating mode from the refrigerant circuit for the first dehumidification heating mode, or when the refrigeration cycle device 10 of the present embodiment is switched to the refrigerant circuit for the second dehumidification heating mode from the refrigerant circuit for the heating mode, the air-conditioning control device opens the pilot on-off valve 22.

Figure 8:
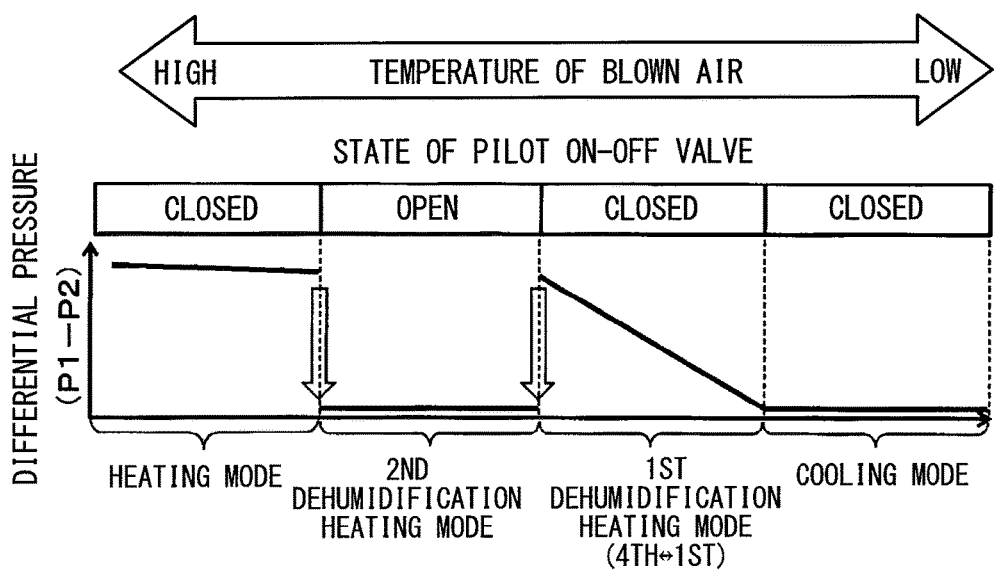
FIG. 8 is a schematic diagram showing a relationship between a differential pressure and an operation mode of the refrigeration cycle device according to the first embodiment.

Here, according to the examination of a pressure difference between the refrigerant pressure P1 at the inflow port 220a of the pilot on-off valve 22 and the refrigerant pressure P2 at the outflow port 220b, that is, differential pressure (P1-P2) between the front and rear sides of the main on-off valve 221, the differential pressure (P1-P2) between the front and rear sides of the main on-off valve 221 at the time of the heating mode and the fourth mode of the first dehumidification heating mode is larger than that at the time of the second dehumidification heating mode as shown in FIG. 8.

When the main on-off valve 221 is opened in a state in which the differential pressure (P1-P2) between the front and rear sides of the main on-off valve 221 is larger as described above, a refrigerant flows to the low-pressure side of the cycle from the high-pressure side of the cycle. For this reason, a large amount of refrigerant passing noise is generated. Accordingly, when the main on-off valve 221 of the pilot on-off valve 22 is opened in the present embodiment, the air-conditioning control device supplies electric power to the solenoid 223 of the pilot on-off valve 22 in a state where the second expansion valve 15b that is an example of the downstream open-close device is fully closed.

Figure 9:
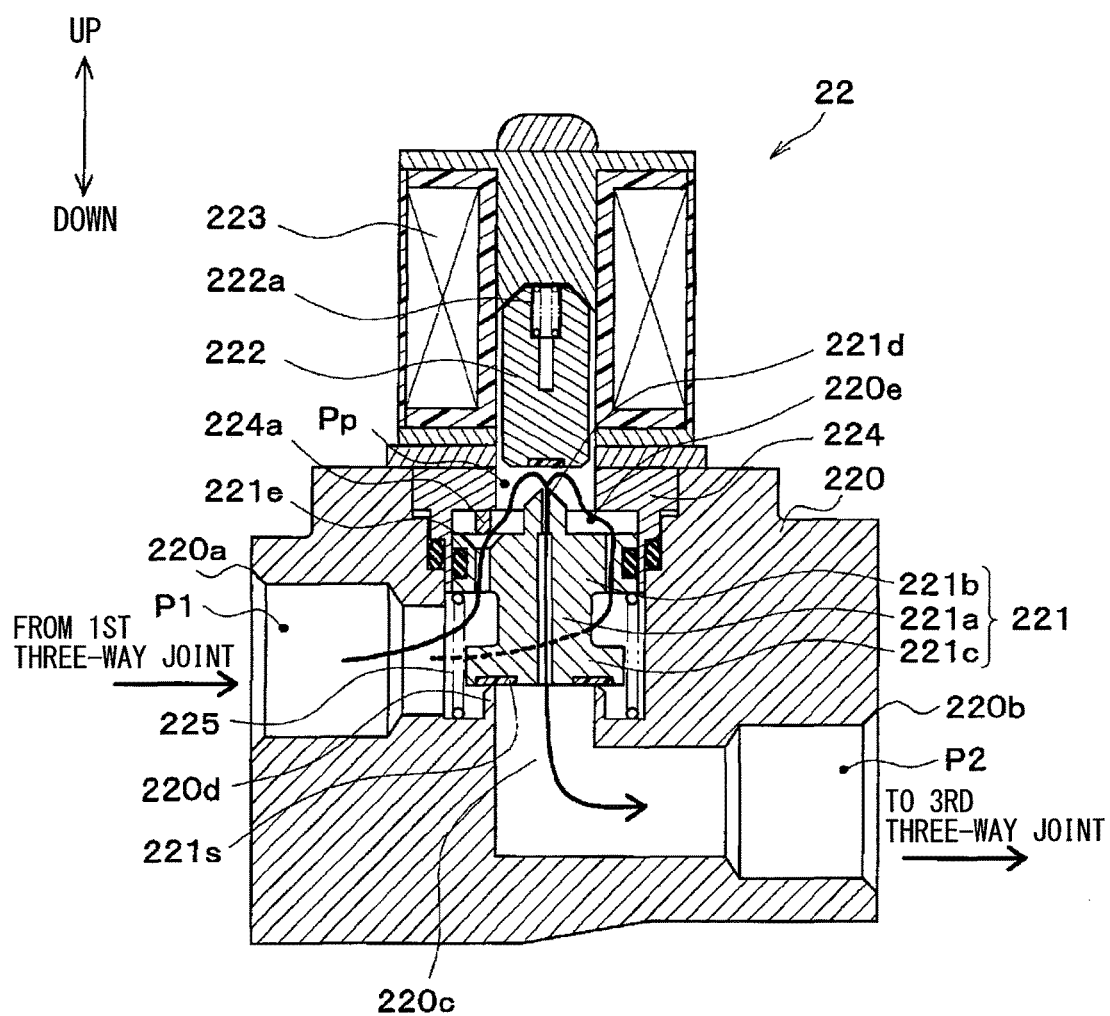
FIG. 9 is a schematic sectional view showing an operating state when a pilot valve of the pilot on-off valve is opened, according to the first embodiment.

When the air-conditioning control device supplies electric power to the solenoid 223 of the pilot on-off valve 22, the pilot valve 222 is attracted by an electromagnetic force of the solenoid 223 and is separated from the main on-off valve 221 as shown in FIG. 9. Accordingly, the outlet-side communication passage 221d is opened, and a refrigerant present at the inflow port 220a flows in the order of the inlet-side communication passages 221e, the pilot space 220e, and the outlet-side communication passage 221d as shown by the thick-line arrow of FIG. 9.

Further, the refrigerant pressure P2 at the outflow port 220b rises so as to be equal to the refrigerant pressure P1 at the inflow port 220a and the refrigerant pressure Pp in the pilot space 220e, so that the refrigerant pressure P1 at the inflow port 220a becomes equal to the refrigerant pressure P2 at the outflow port 220b.

Figure 10:
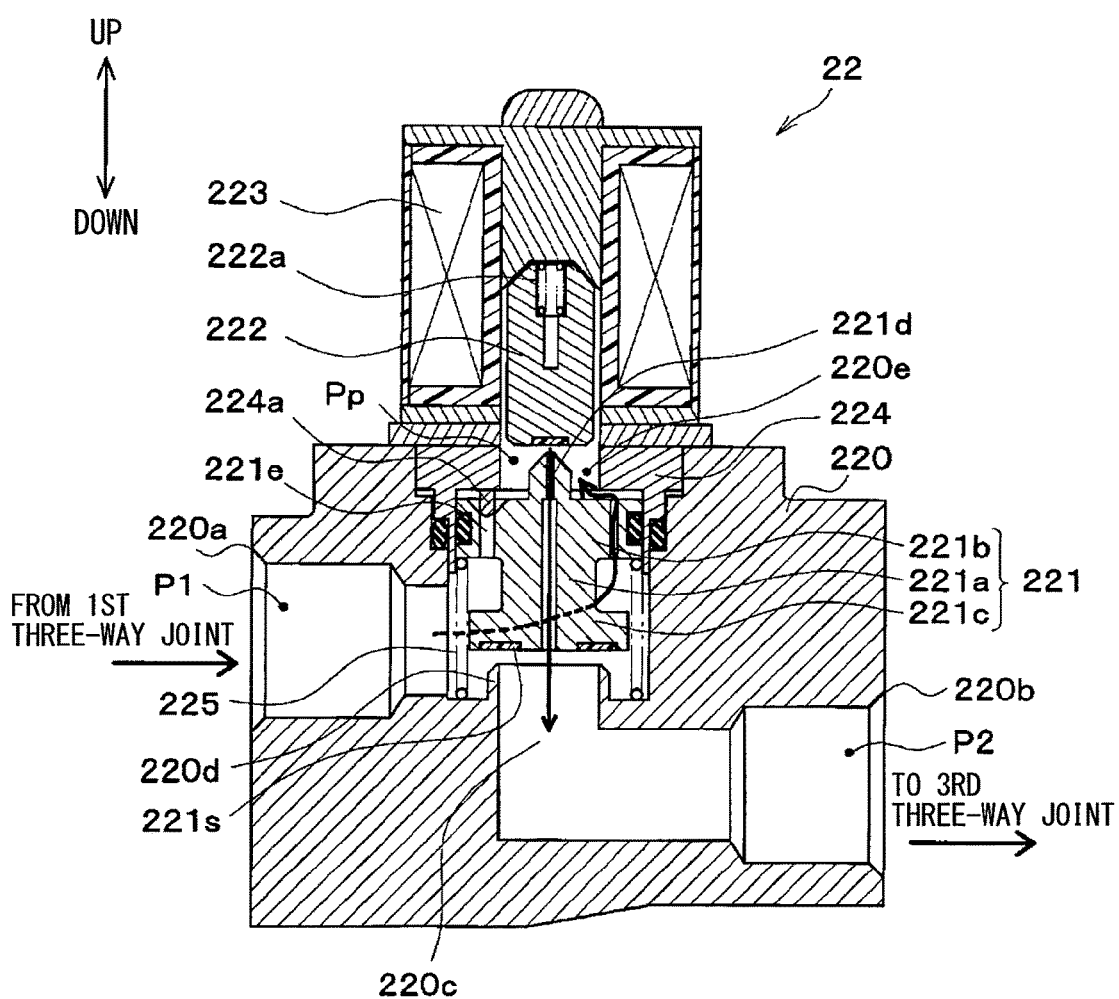
FIG. 10 is a schematic sectional view showing a state in which the main on-off valve of the pilot on-off valve is open, according to the first embodiment.

When the differential pressure (P1–P2) between the front and rear sides of the main on-off valve 221 is reduced due to this equalization of pressure and a load applied to the main on-off valve 221 in the valve closing direction ([the differential pressure (P1–P2) between the front and rear sides of the main on-off valve 221]×[the area of the surface of the main on-off valve receiving pressure]) becomes smaller than a load applied in the valve closing direction that is generated in the valve opening direction by the main on-off valve spring 225, the main on-off valve 221 is separated from the seat portion 220d as shown in FIG. 10. Accordingly, the second refrigerant passage 14b (the bypass passage) is opened.

After that, when the air-conditioning control device changes the state of the second expansion valve 15b to the throttle state from the fully closed state by opening the second expansion valve 15b, the operation of the second dehumidification heating mode is achieved. Since the refrigerant having been depressurized by the second expansion valve 15b flows into the indoor evaporator 18 in the second dehumidification heating mode, the refrigerant pressure P2 at the outflow port 220b is lower than the refrigerant pressure P2 at the outflow port 220b that is obtained when the second expansion valve 15b is in the fully closed state.

In this case, when the main on-off valve 221 opens the main passage 220c in the pilot on-off valve 22 of the present embodiment as shown in FIG. 10, a part of the inlet-side communication passages 221e are closed by the passage closing pins 224a. Accordingly, the total refrigerant passage area of the inlet-side communication passages 221e is smaller than the refrigerant passage area of the outlet-side communication passage 221d. Therefore, the refrigerant pressure Pp in the pilot space 220e is likely to approach the refrigerant pressure P2 at the outflow port 220b and a pressure difference between the refrigerant pressure P1 at the inflow port 220a and the refrigerant pressure P2 at the outflow port 220b increases. For this reason, a force, which holds the main on-off valve 221 in the valve opening direction, is applied.

Accordingly, after the mode of the refrigeration cycle device is switched to the second dehumidification heating mode, the main on-off valve 221 does not close the main passage 220c even though the refrigerant pressure P2 at the outflow port 220b is lowered. Therefore, the main passage 220c in a state in which the main passage 220c is stably opened can be maintained.

Figure 11:
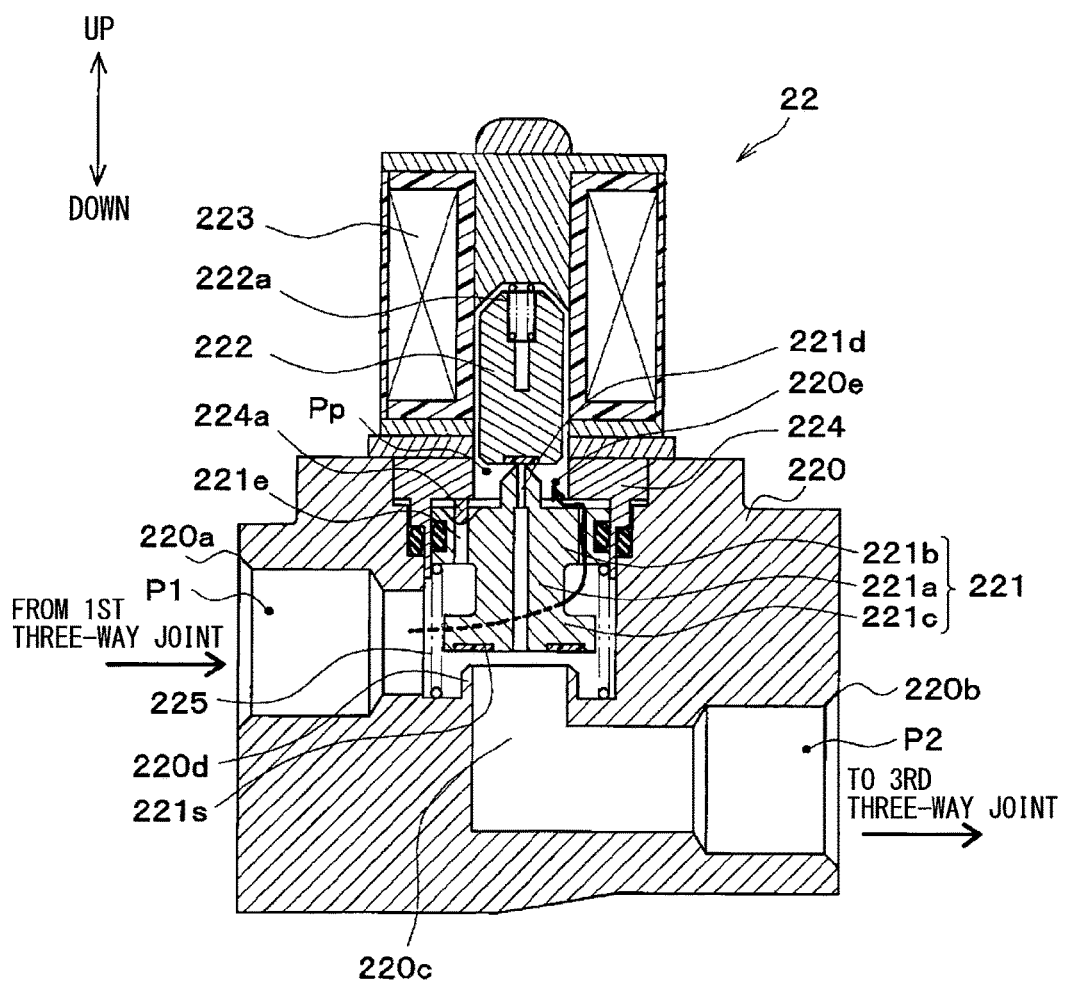
FIG. 11 is a schematic sectional view showing an operating state when the pilot valve of the pilot on-off valve is closed, according to the first embodiment.

Further, when the second refrigerant passage 14b is closed and the refrigeration cycle device is switched to the refrigerant circuit for the other operation mode (the first dehumidification heating mode or the heating mode) from the refrigerant circuit for the second dehumidification heating mode, the air-conditioning control device stops supplying electric power to the solenoid 223. When the air-conditioning control device stops supplying electric power to the solenoid 223, the pilot valve 222 is pressed to the main on-off valve 221 due to the load of the pilot spring 222a as shown in FIG. 11.

Accordingly, the outlet-side communication passage 221d is closed, so that the refrigerant pressure Pp in the pilot space 220e approaches the refrigerant pressure P1 at the inflow port 220a. That is, since the refrigerant pressure Pp in the pilot space 220e becomes equal to the refrigerant pressure P1 at the inflow port 220a, a pressure difference between the refrigerant pressure P1 at the inflow port 220a and the refrigerant pressure P2 at the outflow port 220b increases. In addition, the main on-off valve 221 receives the load of the pilot spring 222a through the pilot valve 222, so that the main on-off valve 221 closes the main passage 220c as shown in FIG. 2.

In the refrigeration cycle device 10 of the present embodiment, as described above, the pilot valve 222 opens the outlet-side communication passage 221d when the main on-off valve 221 of the pilot on-off valve 22 opens the second refrigerant passage 14b. Accordingly, a pressure difference between the refrigerant pressure P1 at the inflow port 220a of the pilot on-off valve 22 and the refrigerant pressure P2 at the outflow port 220b can be reduced.

In addition, while the second expansion valve 15b as an example of the downstream open-close device closes a refrigerant passage provided on the downstream side of the outflow port 220b of the pilot on-off valve 22, the pilot valve 222 opens the outlet-side communication passage 221d. Accordingly, the refrigerant pressure P2 at the outflow port 220b can approach the refrigerant pressure P1 of the high-pressure refrigerant at the inflow port 220a.

Therefore, it is possible to reduce the differential pressure (P1–P2) between the front and rear sides of the main on-off valve 221 without lowering refrigerant pressure on the high-pressure side of the cycle. As a result, a refrigerant passing noise, which is generated when the pilot on-off valve 22 opens the second refrigerant passage 14b, can be sufficiently reduced without lowering the refrigerating capacity of the refrigeration cycle device 10 and lowering the temperature of air that is blown into the vehicle interior when the operation mode is switched.

Further, the total refrigerant passage area of the inlet-side communication passages 221e is larger than that of the outlet-side communication passage 221d in the pilot on-off valve 22 of the present embodiment. Accordingly, when the pilot valve 222 opens the outlet-side communication passage 221d (when the state of FIG. 2 is changed into the state of FIG. 9), it is easy to introduce the high-pressure refrigerant, which is present at the inflow port 220a, into the pilot space 220e.

For this reason, while the pilot valve 222 opens the outlet-side communication passage 221d and the refrigerant pressure P1 at the inflow port 220a becomes equal to the refrigerant pressure P2 at the outflow port 220b, the opening of the main passage 220c performed by the main on-off valve 221, which is caused by the lowering of the refrigerant pressure Pp in the pilot space 220e, is suppressed.

In addition, since the passage closing pins 224a as an example of the passage area-reducing portion reduce the refrigerant passage area of the inlet-side communication passages 221e when the main on-off valve 221 opens the main passage 220c, the refrigerant pressure Pp in the pilot space 220e is likely to be lowered. Accordingly, the on-off valve 221 in a state in which the on-off valve 221 is stably opened can be maintained.

Second Embodiment

Figure 12:
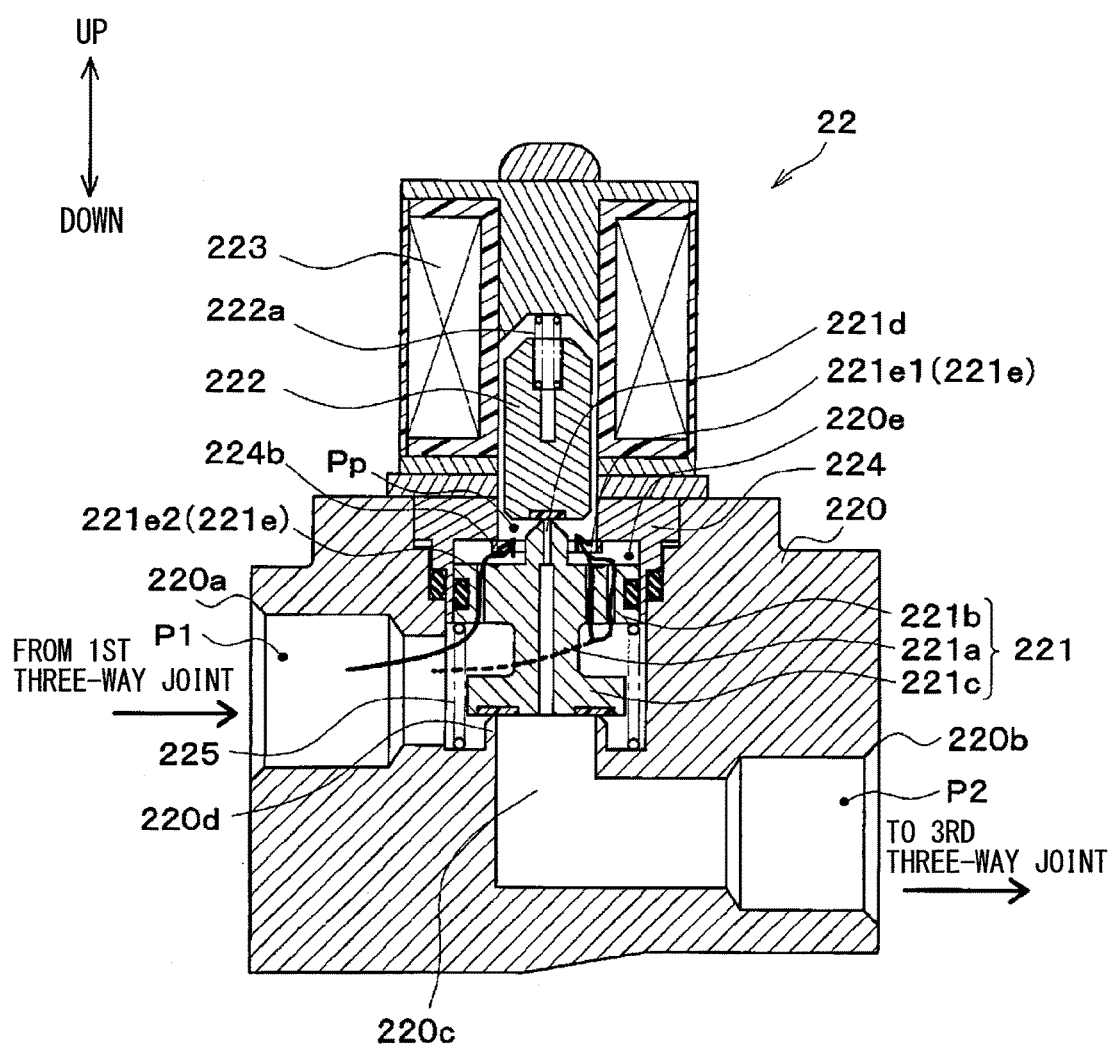
FIG. 12 is a schematic sectional view showing a state in which a main on-off valve of a pilot on-off valve is closed, according to a second embodiment of the present disclosure.
Figure 13:
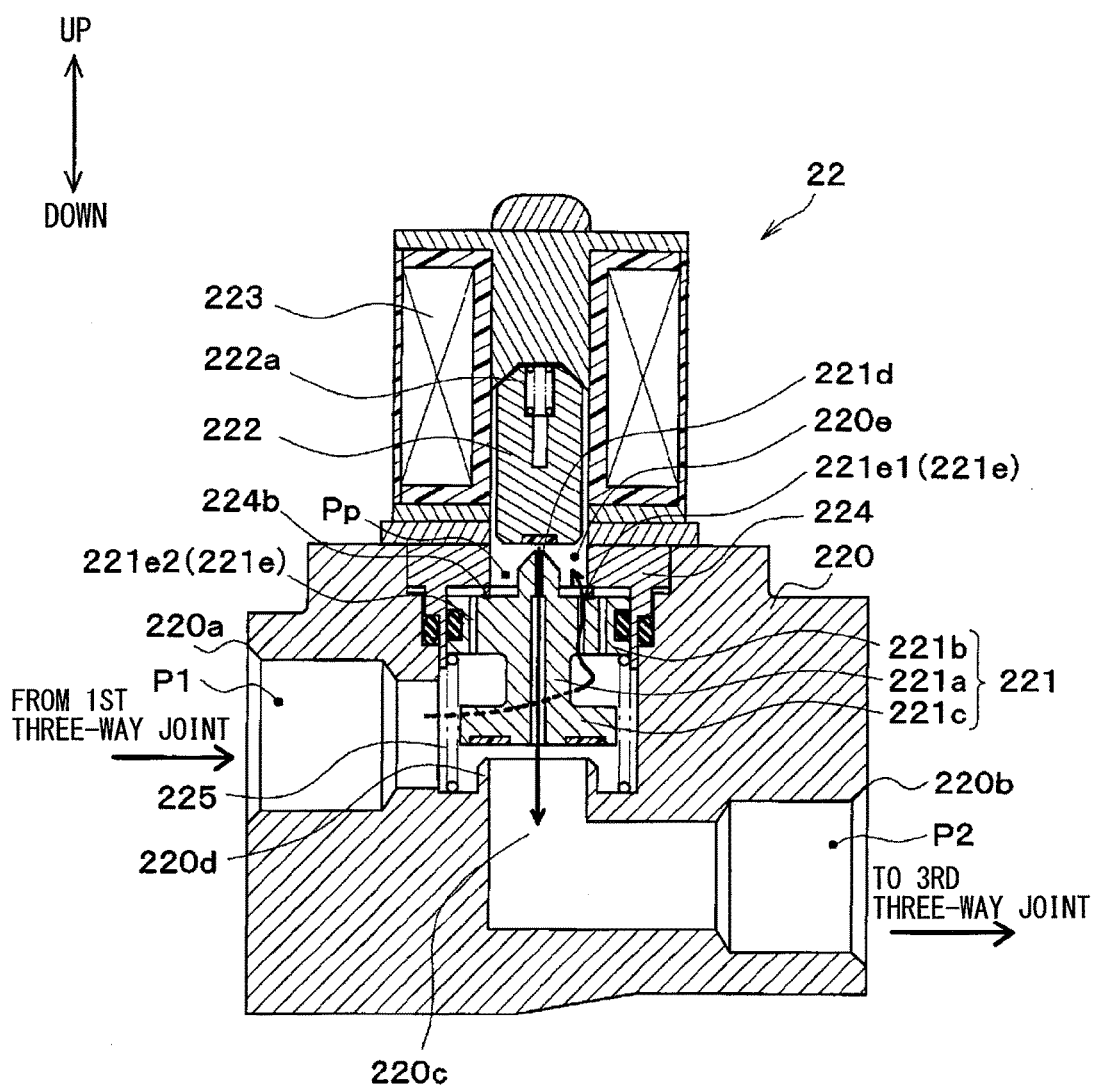
FIG. 13 is a schematic sectional view showing a state in which the main on-off valve of the pilot on-off valve is open, according to the second embodiment.

An example in which the structures of the inlet-side communication passage 221e of the pilot on-off valve 22 and the passage area-reducing portion of the first embodiment are changed as shown in FIGS. 12 and 13 will be described in the present embodiment. FIGS. 12 and 13 are views corresponding to FIGS. 2 and 10 of the first embodiment, respectively, and the same portions as the portions of the first embodiment or portions equivalent to the portions of the first embodiment are denoted by the same reference numerals. This is also the same in the following drawings.

Specifically, a plurality of inlet-side communication passages 221e of the present embodiment are provided at the upper surface-side disc-shaped portion 221b of the main on-off valve 221, and are classified broadly into two kinds of inlet-side communication passages, that is, inner inlet-side communication passages 221e1 disposed on a side close to a central axis of the main on-off valve 221 and outer inlet-side communication passages 221e2 disposed on a side distant from the central axis.

In addition, the total refrigerant passage area of the inlet-side communication passages 221e1 and the inlet-side communication passages 221e2 is larger than the refrigerant passage area of the outlet-side communication passage 221d. Further, in the present embodiment, the passage closing pins 224a are not provided and the pilot space forming member 224 is provided with a cylindrical annular seal member 224b.

As shown in FIG. 13, the annular seal member 224b is formed so as to have a diameter that allows the annular seal member 224b to come into contact with a portion, which is positioned between an opening portion of the inner inlet-side communication passage 221e1 and an opening portion of the outer inlet-side communication passage 221e2, of an upper surface of the upper surface-side disc-shaped portion 221b of the main on-off valve 221 when the main on-off valve 221 opens the main passage 220c.

Accordingly, when the main on-off valve 221 opens the main passage 220c, the flow of a refrigerant flowing to the pilot space 220e from the inflow port 220a through the outer inlet-side communication passages 221e2 is cut off. Therefore, when the main on-off valve 221 opens the main passage 220c, the total refrigerant passage area of the inlet-side communication passages 221e becomes smaller than the refrigerant passage area of the outlet-side communication passage 221d. That is, the annular seal member 224b may be used as an example of the passage area-reducing portion in the present embodiment.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

In addition, since the annular seal member 224b is employed as an example of the passage area-reducing portion in the present embodiment, the main on-off valve 221 does not need to be aligned about the axis in contrast to the structure that closes a part of the inlet-side communication passages 221e by passage closing pins or the like. Accordingly, assemblability and the like at the time of the production of the pilot on-off valve 22 can be improved.

Third Embodiment

Figure 14:
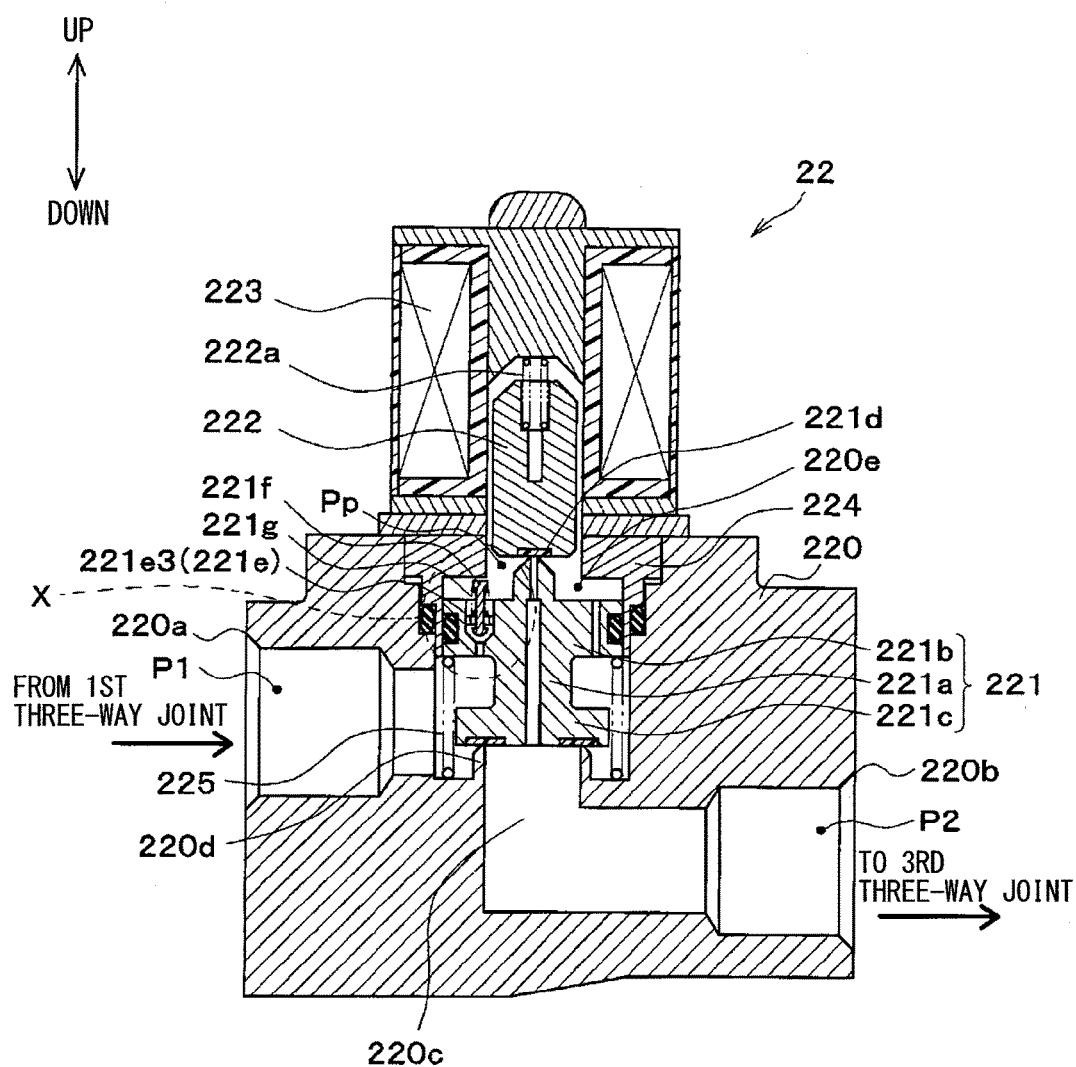
FIG. 14 is a schematic sectional view showing a state in which a main on-off valve of a pilot on-off valve is closed, according to a third embodiment of the present disclosure.

An example in which the structures of the inlet-side communication passage 221e of the pilot on-off valve 22 and the passage area-reducing portion of the first embodiment are changed as shown in FIG. 14 will be described in the present embodiment. Specifically, in the present embodiment, valve bodies 221f, which open and close inlet-side communication passages 221e3, are disposed in a part of the inlet-side communication passages 221e3, and the valve bodies 221f may be used as an example of the passage area-reducing portion.

Figure 15:
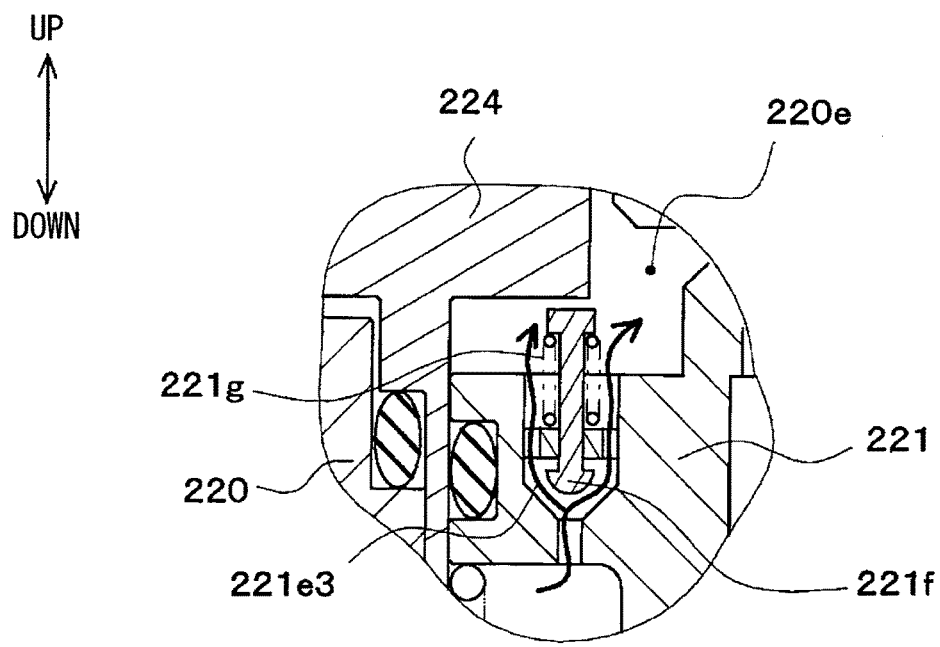
FIG. 15 is a schematic sectional view of a portion X of FIG. 14 when the main on-off valve of the pilot on-off valve is closed, according to the third embodiment.

When the main on-off valve 221 is displaced to the seat portion 220d (the lower side in FIGS. 14 and 15) and closes the main passage 220c, the valve body 221f opens the inlet-side communication passage 221e3 by the load of a spring 221g for a valve body disposed in the inlet-side communication passage 221e as shown in an enlarged cross-sectional view of FIG. 15.

Figure 16:
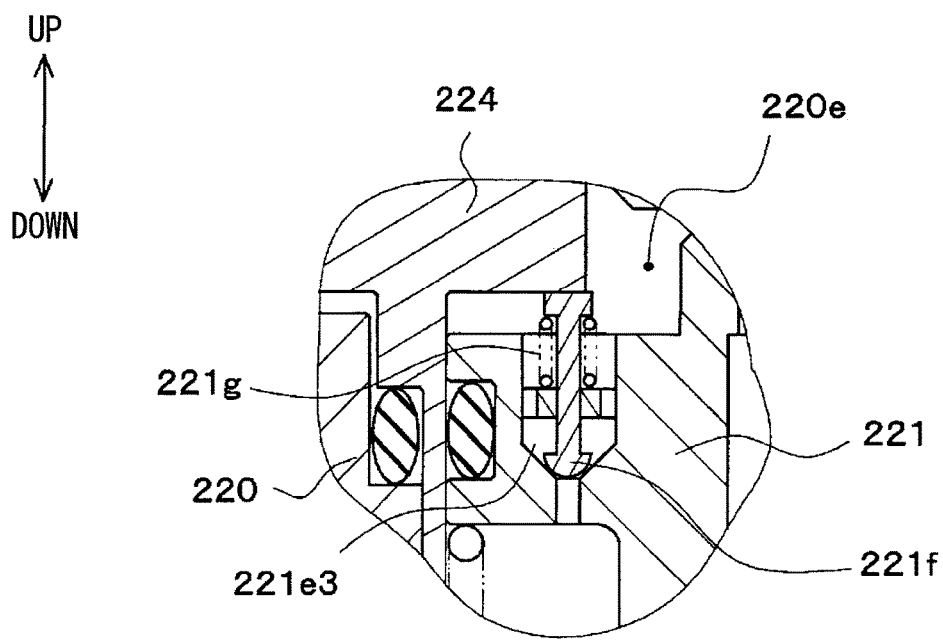
FIG. 16 is a schematic sectional view of the portion X of FIG. 14 when the main on-off valve of the pilot on-off valve is open, according to the third embodiment.

On the other hand, when the main on-off valve 221 is displaced to a side in which the main on-off valve 221 is separated from the seat portion 220d (the upper side in FIGS. 14 and 16) and opens the main passage 220c, an end portion of the valve body 221f close to the pilot space 220e (the upper side in FIG. 16) comes into contact with the pilot space forming member 224 as shown in an enlarged cross-sectional view of FIG. 16. Accordingly, the displacement of the valve body 221f is restricted.

In addition, when the main on-off valve 221 is pressed against the valve body 221f of which the displacement is restricted, a part of the inlet-side communication passages 221e3 are closed. Accordingly, when the main on-off valve 221 opens the main passage 220c, the total refrigerant passage area of the inlet-side communication passages 221e becomes smaller than the refrigerant passage area of the outlet-side communication passage 221d.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

In addition, since the valve bodies 221f disposed in the inlet-side communication passages 221e are employed as an example of the passage area-reducing portion in the present embodiment, the main on-off valve 221 does not need to be aligned about the axis as in the second embodiment. Accordingly, assemblability and the like at the time of the production of the pilot on-off valve 22 can be improved.

Fourth Embodiment

Figure 17:
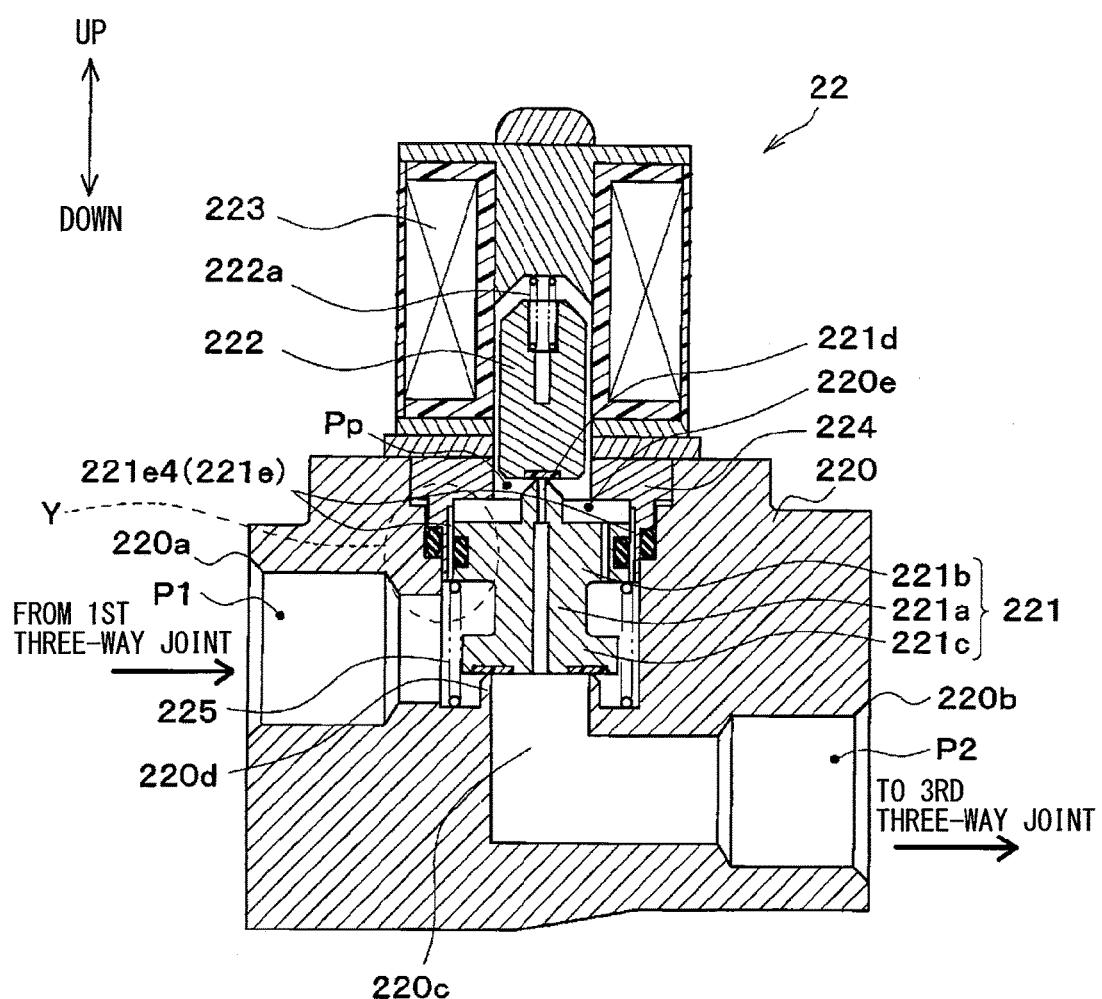
FIG. 17 is a schematic sectional view showing a state in which a main on-off valve of a pilot on-off valve is closed, according to a fourth embodiment of the present disclosure.

An example in which the structure of the inlet-side communication passage 221e of the pilot on-off valve 22 of the first embodiment is changed as shown in FIG. 17 will be described in the present embodiment. Specifically, in the present embodiment, a part of inlet-side communication passages 221e4 is formed on the inner wall surface of a cylinder portion, which is disposed on the outer peripheral side of the upper surface-side disc-shaped portion 221b of the main on-off valve 221, of the pilot space forming member 224.

Figure 18:
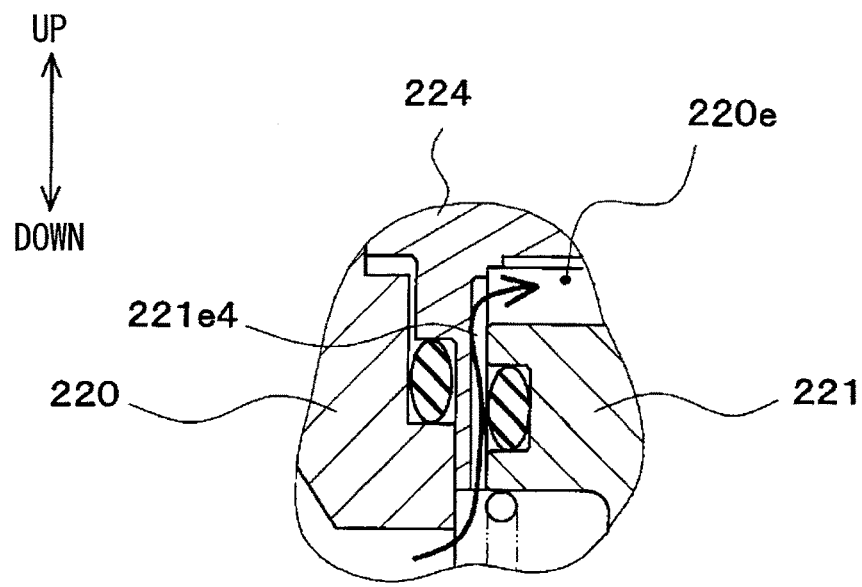
FIG. 18 is a schematic sectional view of a portion Y of FIG. 17 when the main on-off valve of the pilot on-off valve is closed, according to the fourth embodiment.
Figure 19:
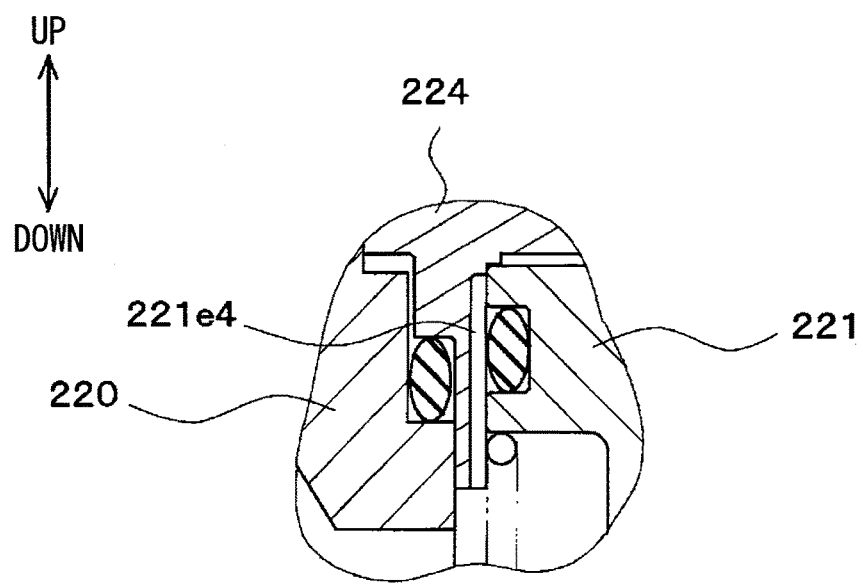
FIG. 19 is a schematic sectional view of the portion Y of FIG. 17 when the main on-off valve of the pilot on-off valve is opened, according to the fourth embodiment.

The inlet-side communication passages 221e4, which are formed on the inner wall surface of this cylinder portion, allow the inflow port 220a and the pilot space 220e to communicate with each other as shown in FIG. 18 when the main on-off valve 221 is displaced to the seat portion 220d (the lower side in FIGS. 17 and 18). On the other hand, when the main on-off valve 221 is displaced to a side in which the main on-off valve 221 is separated from the seat portion 220d (the upper side in FIGS. 17 and 19), the inlet-side communication passages 221e4 are closed by the outer peripheral side of the upper surface-side disc-shaped portion 221b as shown in FIG. 19.

Accordingly, the total refrigerant passage area of the inlet-side communication passages 221e becomes larger than the refrigerant passage area of the outlet-side communication passage 221d when the main on-off valve 221 closes the main passage 220c, and the total refrigerant passage area of the inlet-side communication passages 221e becomes smaller than the refrigerant passage area of the outlet-side communication passage 221d when the main on-off valve 221 opens the main passage 220c. That is, in the present embodiment, the upper surface-side disc-shaped portion 221b of the main on-off valve 221 is used as an example of the passage area-reducing portion.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

In addition, since a part of the inlet-side communication passages 221e4 is formed on the pilot space forming member 224 and the upper surface-side disc-shaped portion 221b of the main on-off valve 221 forms an example of the passage area-reducing portion in the present embodiment, it is not necessary to form specific inlet-side communication passages 221e in the main on-off valve 221. Moreover, the main on-off valve 221 does not need to be aligned at the time of assembly as in the second embodiment and the like. Accordingly, assemblability and the like at the time of the production of the pilot on-off valve 22 can be improved.

Fifth Embodiment

Figure 20:
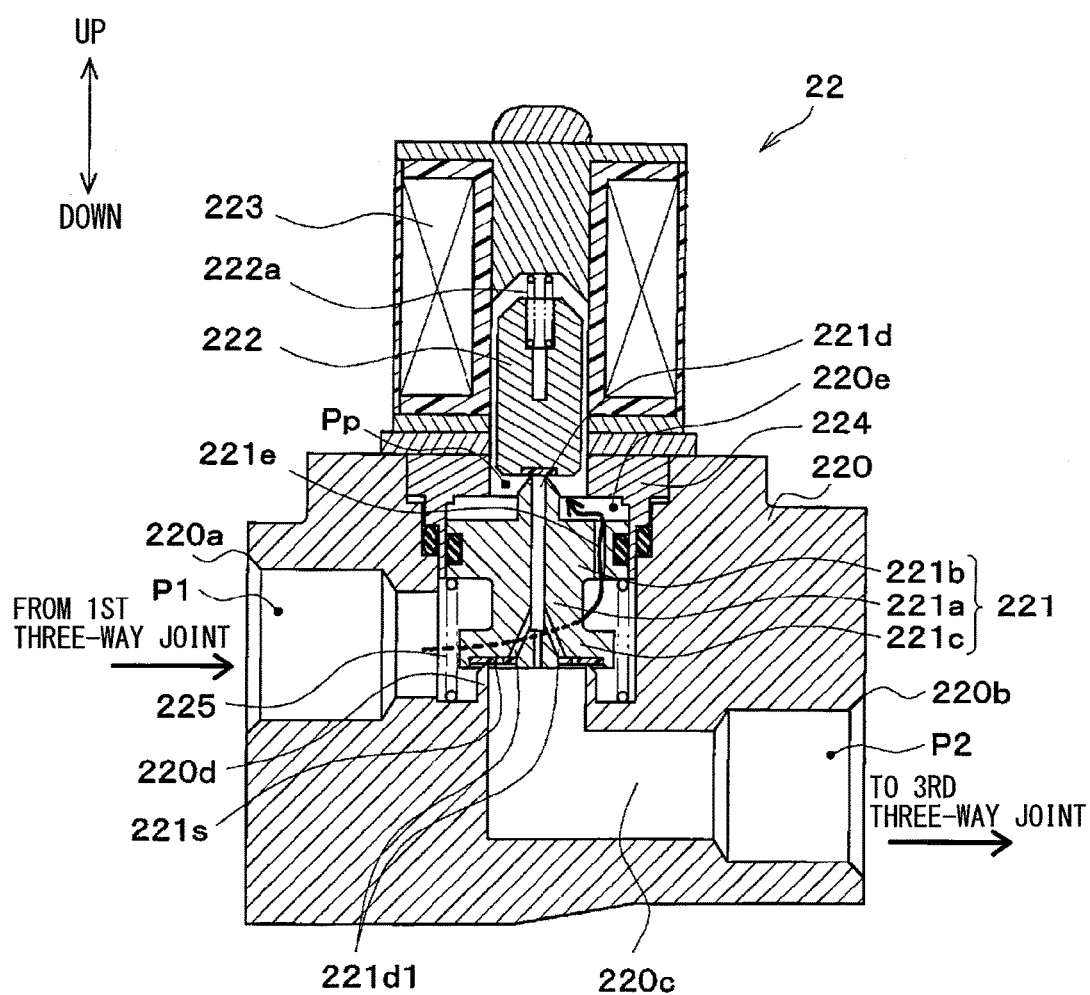
FIG. 20 is a schematic sectional view showing a state in which a main on-off valve of a pilot on-off valve is closed, according to a fifth embodiment of the present disclosure.
Figure 21:
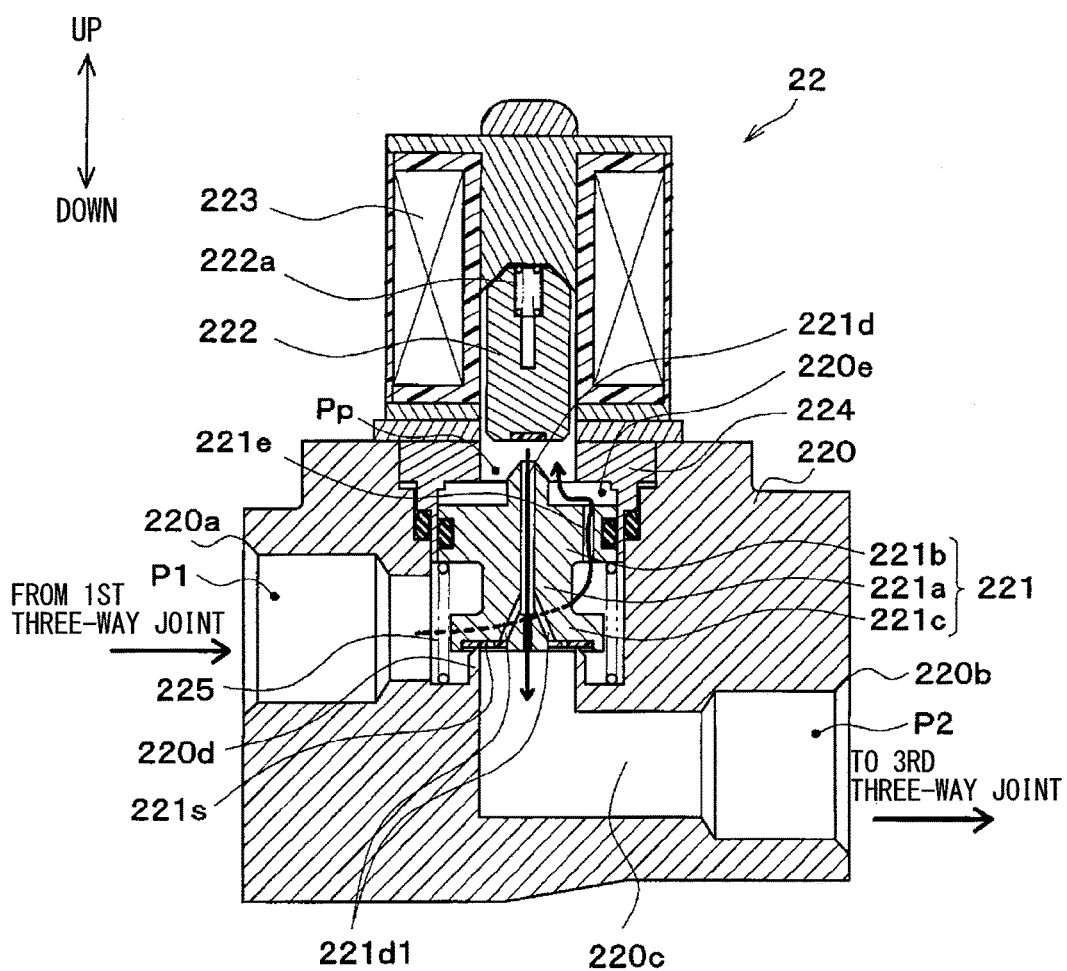
FIG. 21 is a schematic sectional view showing an operating state when a pilot valve of the pilot on-off valve is opened, according to the fifth embodiment.
Figure 22:
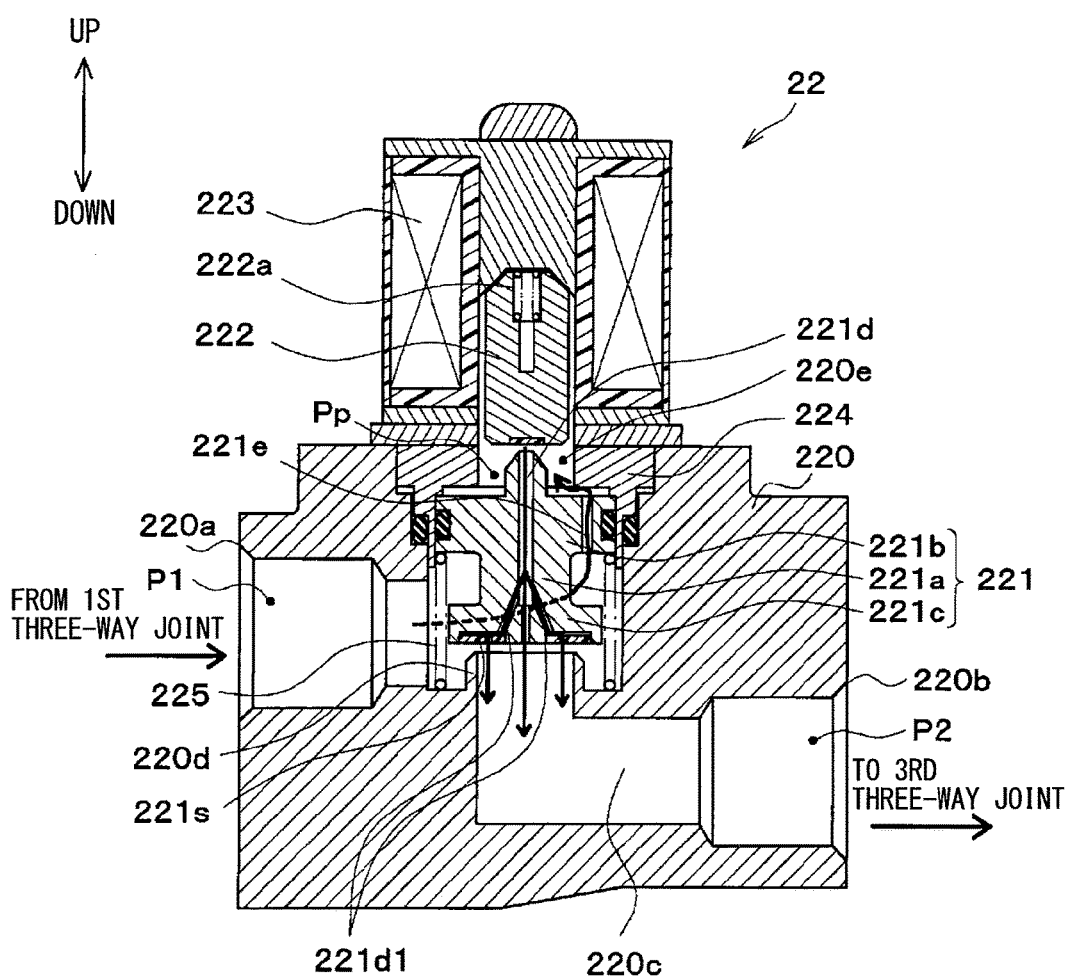
FIG. 22 is a schematic sectional view showing a state in which the main on-off valve of the pilot on-off valve is open, according to the fifth embodiment.

An example in which the structures of the inlet-side communication passage 221e and the outlet-side communication passage 221d of the pilot on-off valve 22 of the first embodiment are changed as shown in FIGS. 20 to 22 will be described in the present embodiment. FIGS. 20 to 22 are views corresponding to FIGS. 2, 9, and 10 of the first embodiment, respectively.

Specifically, the passage closing pins 224a of the first embodiment and the inlet-side communication passages 221e, which are closed by the passage closing pins 224a, among the plurality of inlet-side communication passages 221e are not provided in the present embodiment. Moreover, in the present embodiment, a plurality of sub-communication passages 221d1 are added to the outlet side of the outlet-side communication passage 221d.

When the main on-off valve 221 is pressed against the seat portion 220d and closes the main passage 220c as shown in FIGS. 20 and 21, the sub-communication passages 221d1 are closed by the seal member 221s that is disposed on the bottom of the bottom-side disc-shaped portion 221c. For this reason, even though the pilot valve 222 opens the outlet-side communication passage 221d as shown in FIG. 21, the total refrigerant passage area of the outlet-side communication passage 221d becomes smaller than the refrigerant passage area of the inlet-side communication passages 221e while the main on-off valve 221 closes the main passage 220c.

On the other hand, when the main on-off valve 221 is separated from the seat portion 220d and opens the main passage 220c, the pilot space 220e and the outflow port 220b are made to communicate with each other through a gap between the bottom of the bottom-side disc-shaped portion 221c and the seal member 221s and a through-hole formed at the seal member 221s as shown in FIG. 22. Accordingly, the total refrigerant passage area of the outlet-side communication passage 221d becomes larger than the refrigerant passage area of the inlet-side communication passages 221e.

That is, the seal member 221s of the present embodiment is used as an example of a passage area-increasing portion, and allows the total refrigerant passage area of the outlet-side communication passage 221d to become larger than the refrigerant passage area of the inlet-side communication passages 221e by opening the sub-communication passages 221d1 when the main on-off valve 221 opens the main passage 220c.

Accordingly, when the main on-off valve 221 opens the main passage 220c in the pilot on-off valve 22 of the present embodiment, the refrigerant pressure Pp in the pilot space 220e is likely to approach the refrigerant pressure P2 at the outflow port 220b. As a result, after the mode of the refrigeration cycle device is switched to the second dehumidification heating mode, the main on-off valve 221 does not close the main passage 220c even though the refrigerant pressure P2 at the outflow port 220b is lowered. Accordingly, the main passage 220c can be stably opened.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

Sixth Embodiment

Figure 23:
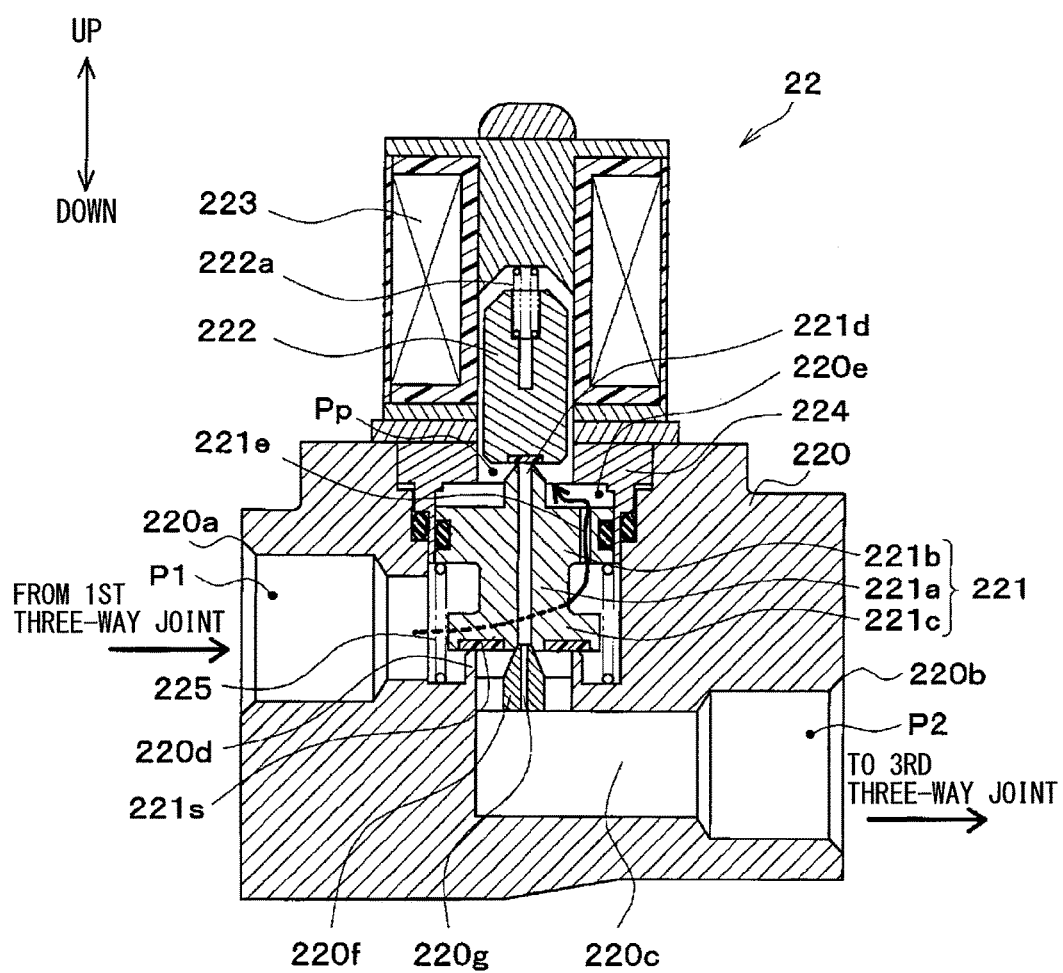
FIG. 23 is a schematic sectional view showing a state in which a main on-off valve of a pilot on-off valve is closed, according to a sixth embodiment of the present disclosure.
Figure 24:
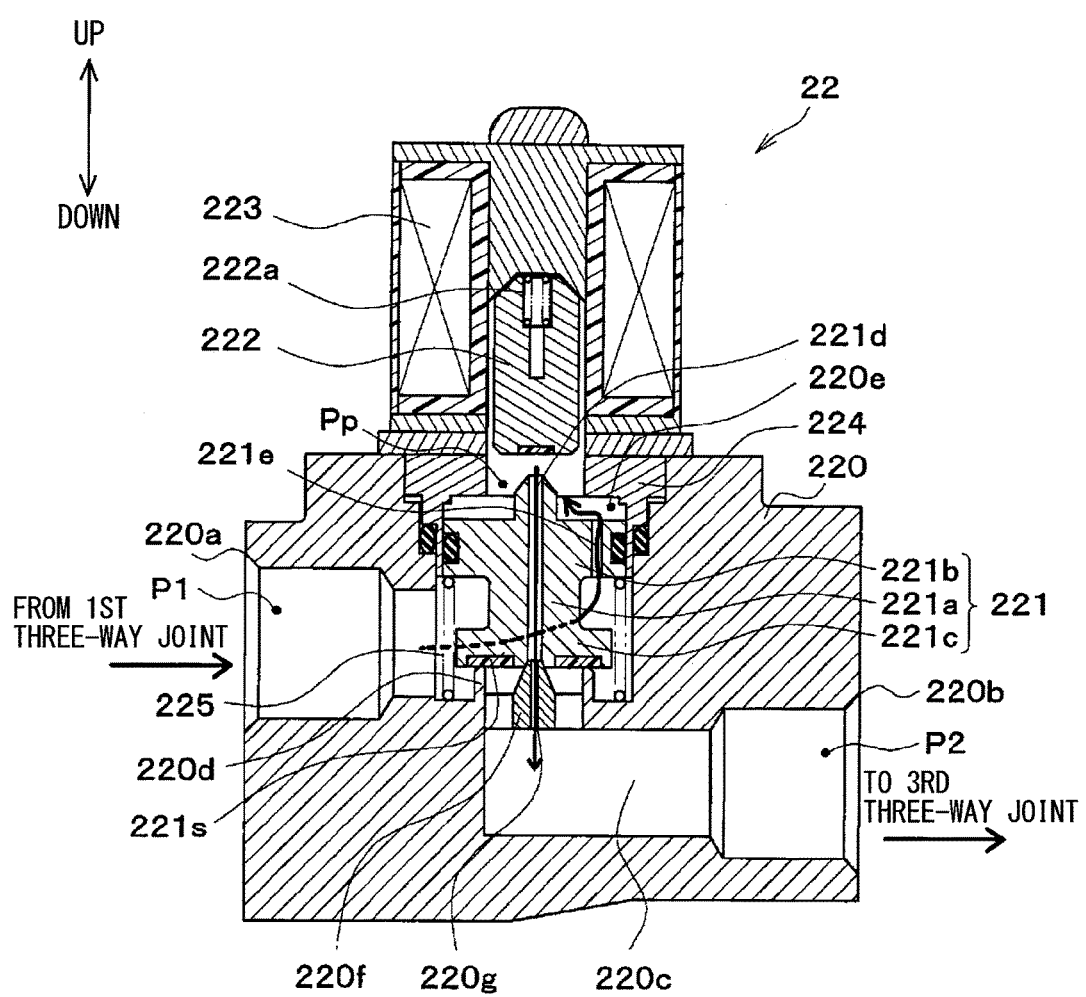
FIG. 24 is a schematic sectional view showing an operating state when a pilot valve of the pilot on-off valve is opened, according to the sixth embodiment.
Figure 25:
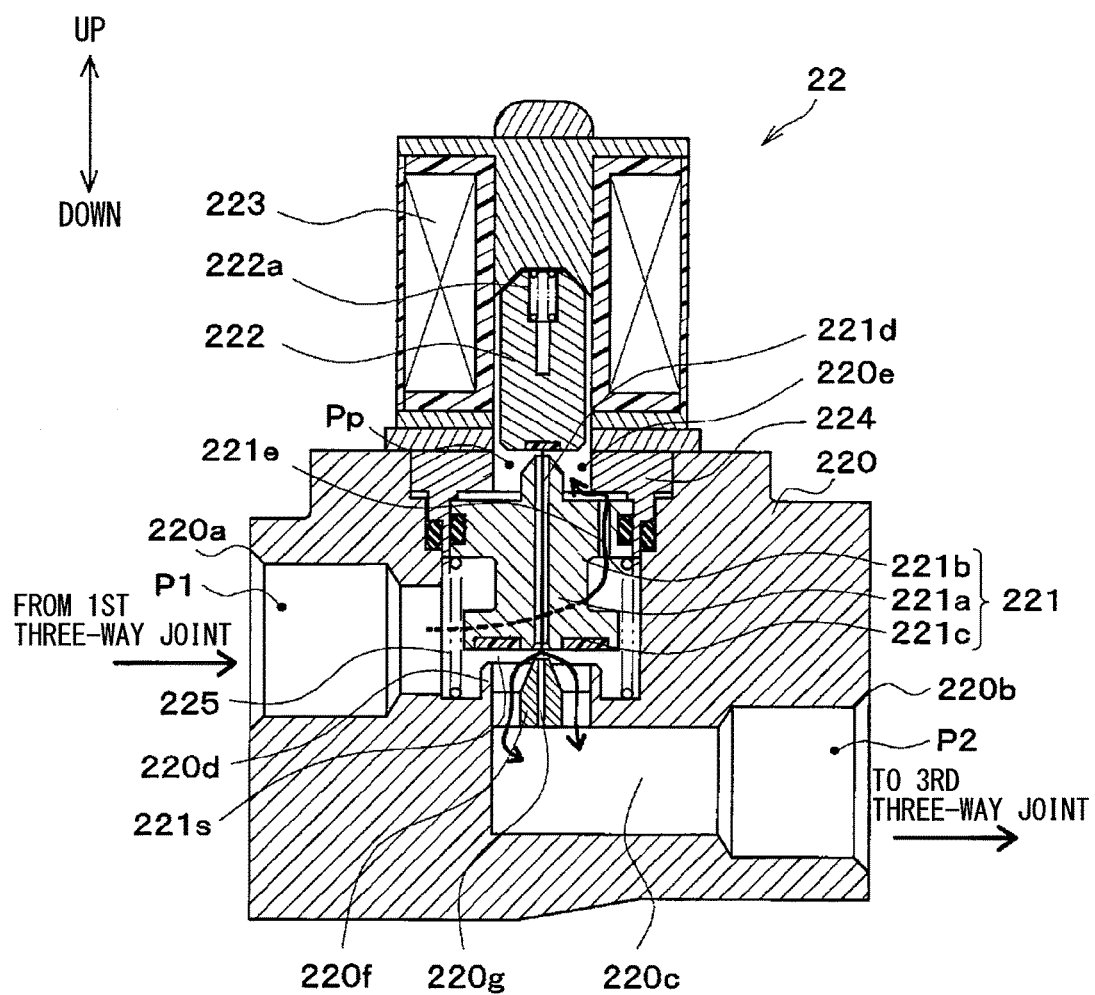
FIG. 25 is a schematic sectional view showing a state in which the main on-off valve of the pilot on-off valve is open, according to the sixth embodiment.

An example in which the structure of the inlet-side communication passage 221e of the pilot on-off valve 22 of the first embodiment is changed as shown in FIGS. 23 to 25 and a passage forming member 220f is provided as an example of the passage area-increasing portion changing the refrigerant passage area of the outlet-side communication passage 221d will be described in the present embodiment. FIGS. 23 to 25 are views corresponding to FIGS. 2, 9, and 10 of the first embodiment, respectively.

Specifically, the passage closing pins 224a and the inlet-side communication passages 221e closed by the passage closing pins 224a are not provided in the present embodiment as in the fifth embodiment. Moreover, the passage forming member 220f is disposed in the main passage 220c, which is formed in the body 220, on the downstream side of the main on-off valve 221 in the flow of a refrigerant and on the inner peripheral side of the seat portion 220d.

The passage forming member 220f is formed in a substantially conical shape that is tapered toward the main on-off valve 221, and the central axis of the passage forming member 220f is disposed coaxially with the central axes of the seat portion 220d and the main on-off valve 221. In addition, a small-diameter communication hole 220g, which extends in the direction of the central axis and allows the internal space of the outlet-side communication passage 221d to communicate with the outflow port 220b, is formed at the central portion of the passage forming member 220f.

Further, the passage forming member 220f is fixed to the body 220 so that a tapered end portion of the passage forming member 220f is inserted into the outlet-side communication passage 221d as shown in FIGS. 23 and 24 when the main on-off valve 221 is pressed against the seat portion 220d and closes the main passage 220c.

For this reason, while the main on-off valve 221 closes the main passage 220c even though the pilot valve 222 opens the outlet-side communication passage 221d as shown in FIG. 24, the refrigerant passage area of the outlet-side communication passage 221d becomes the refrigerant passage area of the small-diameter communication hole 220g of the passage forming member 220f and becomes smaller than the refrigerant passage area of the inlet-side communication passages 221e.

On the other hand, when the main on-off valve 221 is separated from the seat portion 220d and opens the main passage 220c, the tapered end portion of the passage forming member 220f is separated from the outlet-side communication passage 221d as shown in FIG. 25. Accordingly, the refrigerant passage area of the outlet-side communication passage 221d becomes larger than the refrigerant passage area of the inlet-side communication passages 221e.

When the main on-off valve 221 opens the main passage 220c in the pilot on-off valve 22 of the present embodiment, the refrigerant pressure Pp in the pilot space 220e is likely to approach the refrigerant pressure P2 at the outflow port 220b by the increase of the refrigerant passage area of the outlet-side communication passage 221d. Accordingly, the main passage 220c as in the fifth embodiment can be stably opened.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

Seventh Embodiment

Figure 26:
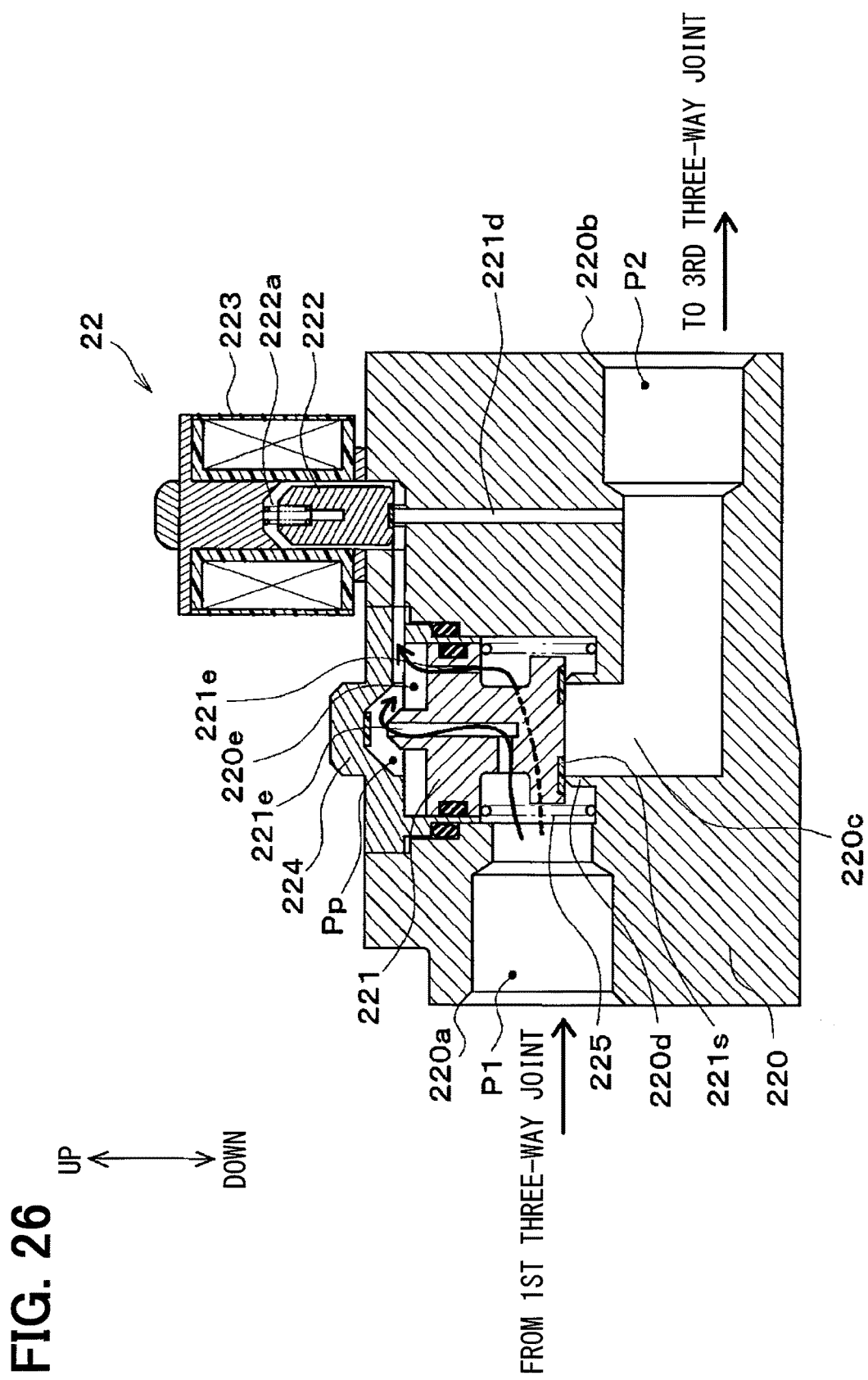
FIG. 26 is a schematic sectional view showing a state in which a main on-off valve of a pilot on-off valve is closed, according to a seventh embodiment of the present disclosure.
Figure 27:
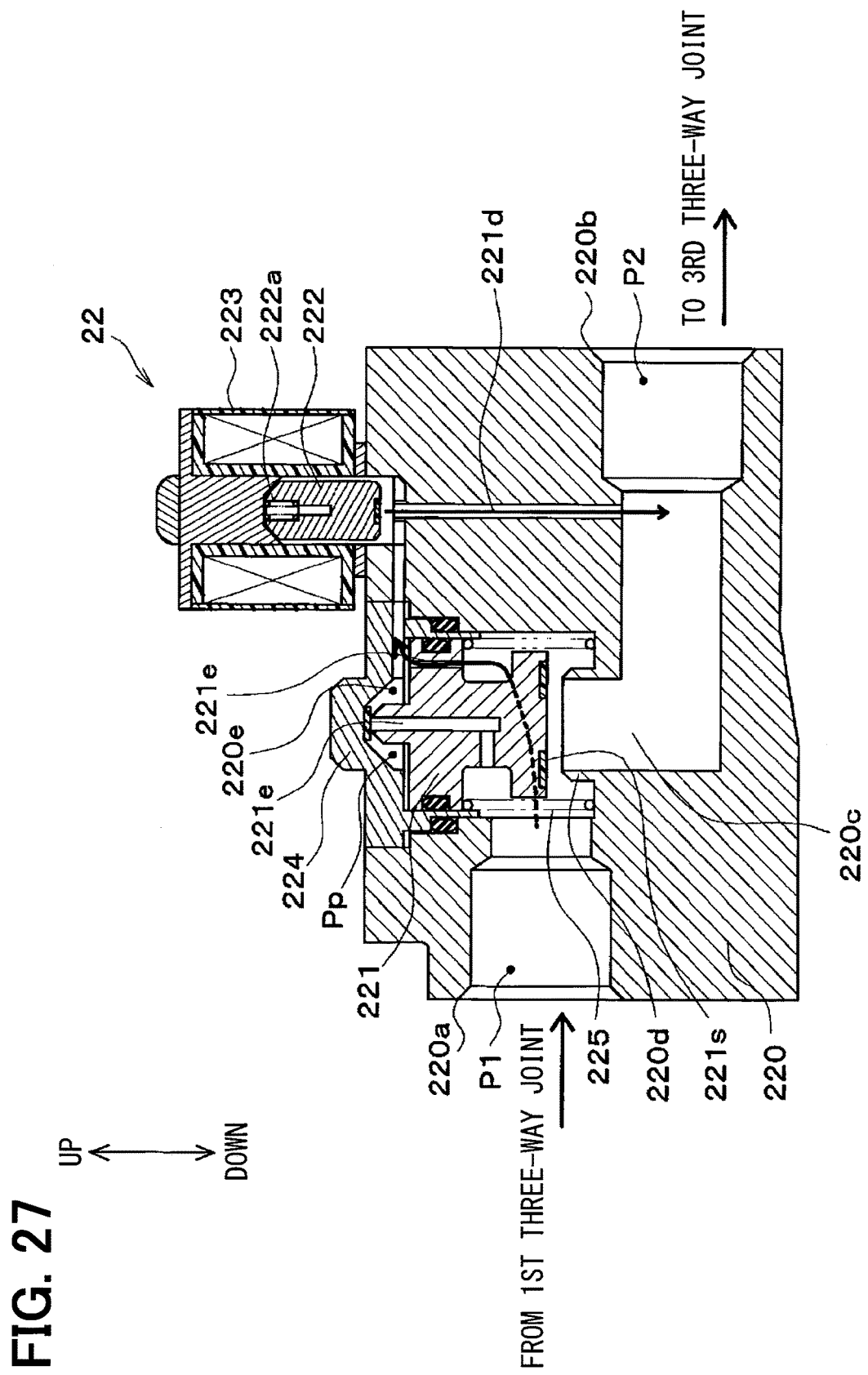
FIG. 27 is a schematic sectional view showing a state in which the main on-off valve of the pilot on-off valve is open, according of the seventh embodiment.

An example in which the central axis of the pilot valve 222 is disposed coaxially with the central axis of the main on-off valve 221 and the pilot valve 222 opens or closes the outlet-side communication passage 221d formed in the main on-off valve 221 has been described in the first embodiment, but an example in which the disposition of the pilot valve 222 and the like is changed as shown in FIGS. 26 and 27 will be described in the present embodiment. FIGS. 26 and 27 are views corresponding to FIGS. 2 and 10 of the first embodiment, respectively.

More specifically, in the present embodiment, the pilot valve 222, the solenoid 223, and the like are disposed on the outside of a range (movable range) in which the main on-off valve 221 is displaced. Further, the pilot valve 222 opens or closes the outlet-side communication passage 221d formed in the body 220. An outlet-side communication passage is not formed in the main on-off valve 221 of the present embodiment.

Further, when the main on-off valve 221 opens the main passage 220c as shown in FIG. 27, the inlet-side communication passage 221e provided at the central portion of the main on-off valve 221 is closed by a resinous seal member fixed to the pilot space forming member 224. Accordingly, the total refrigerant passage area of the inlet-side communication passages 221e becomes smaller than the refrigerant passage area of the outlet-side communication passage 221d. Therefore, the passage area-reducing portion is formed of the resinous seal member fixed to the pilot space forming member 224 in the present embodiment.

The other structures and operations of the vehicle air conditioning system 1 and the refrigeration cycle device 10 are the same as those of the first embodiment. Accordingly, even though the structure of the pilot on-off valve 22 is changed as in the present embodiment, a refrigerant passing noise, which is generated when the pilot on-off valve 22 opens the second refrigerant passage 14b, can be sufficiently reduced without lowering refrigerant pressure on the high-pressure side of the refrigeration cycle device 10 as in the first embodiment.

Moreover, since the pilot valve 222 is disposed on the outside of a range, in which the main on-off valve 221 is displaced, in the present embodiment, a stroke of the pilot valve 222 (a moving distance of the pilot valve when the pilot valve is displaced to a state where the pilot valve fully opens the outlet-side communication passage 221d from a state where the pilot valve closes the outlet-side communication passage 221d) can be set to be smaller than a stroke of the main on-off valve 221 (a moving distance of the main on-off valve 221 when the main on-off valve 221 is displaced to a state where the main on-off valve 221 fully opens the main passage 220c from a state where the main on-off valve 221 closes the main passage 220c).

Accordingly, since the size of the pilot valve 222 and the size of the solenoid 223 that drives and displaces the pilot valve 222 can be reduced, it is possible to reduce the size of the pilot on-off valve 22 as a whole.

Eighth Embodiment

Figure 28:
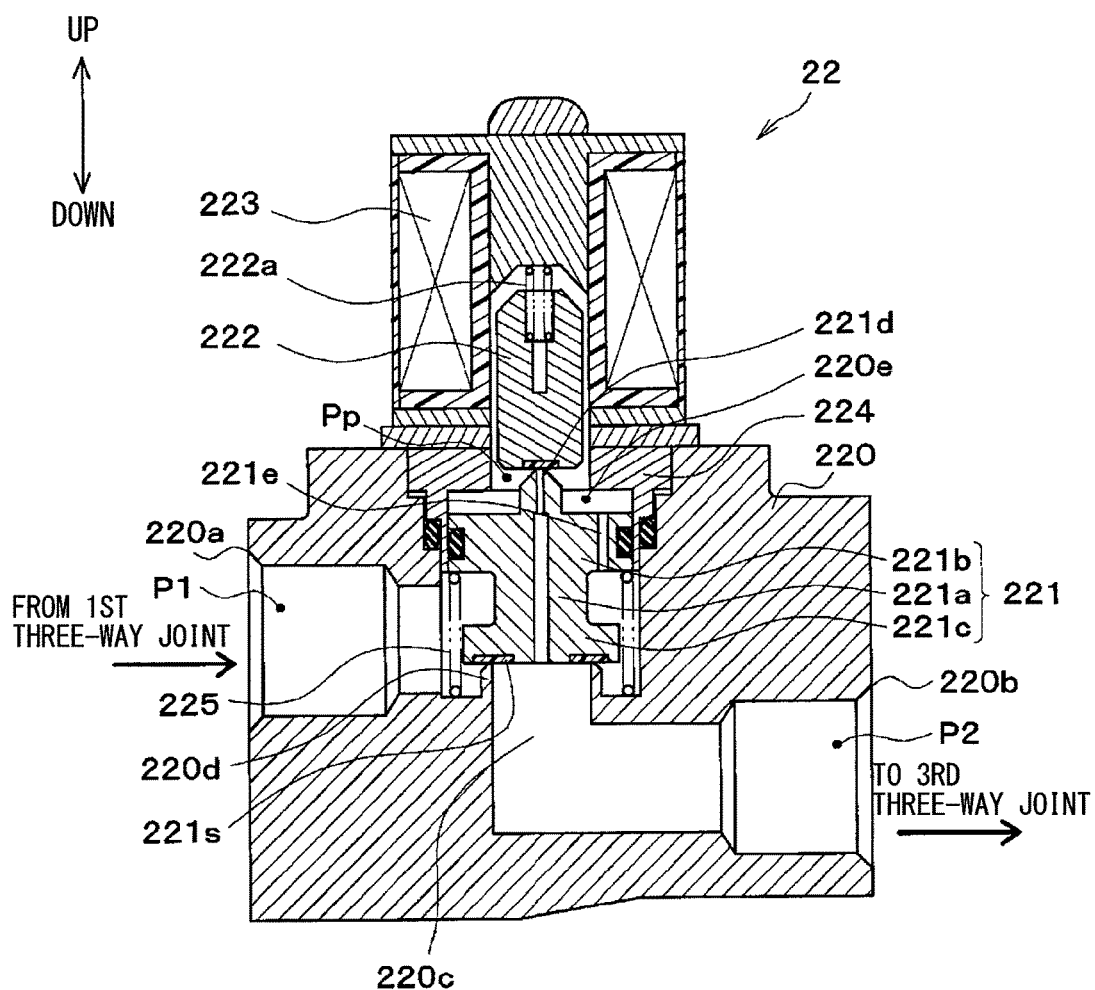
FIG. 28 is a schematic sectional view showing a state in which a main on-off valve of a pilot on-off valve is closed, according to an eighth embodiment of the present disclosure.

The passage closing pins 224a of the first embodiment, the inlet-side communication passages 221e, which are closed by the passage closing pins 224a, among the plurality of inlet-side communication passages 221e of the first embodiment, and the like are not provided in a pilot on-off valve 22 of the present embodiment as shown in FIG. 28. That is, the pilot on-off valve 22 of the present embodiment is not provided with the passage area-reducing portion and the passage area-increasing portion that have been described in the above-mentioned embodiments.

Even in the pilot on-off valve 22 of the present embodiment, the differential pressure (P1-P2) between the front and rear sides of the main on-off valve 221 is not increased relatively at the time of the second dehumidification heating mode and the main passage 220c in a state, in which the main passage 220c is stably opened, can be maintained at the time of the second dehumidification heating mode in a refrigeration cycle device in which a load applied to the main on-off valve 221 in the valve closing direction does not exceed a load that is generated in the valve opening direction by the main on-off valve spring 225. Accordingly, the same effects as the first embodiment can be obtained.

Ninth Embodiment

Figure 29:
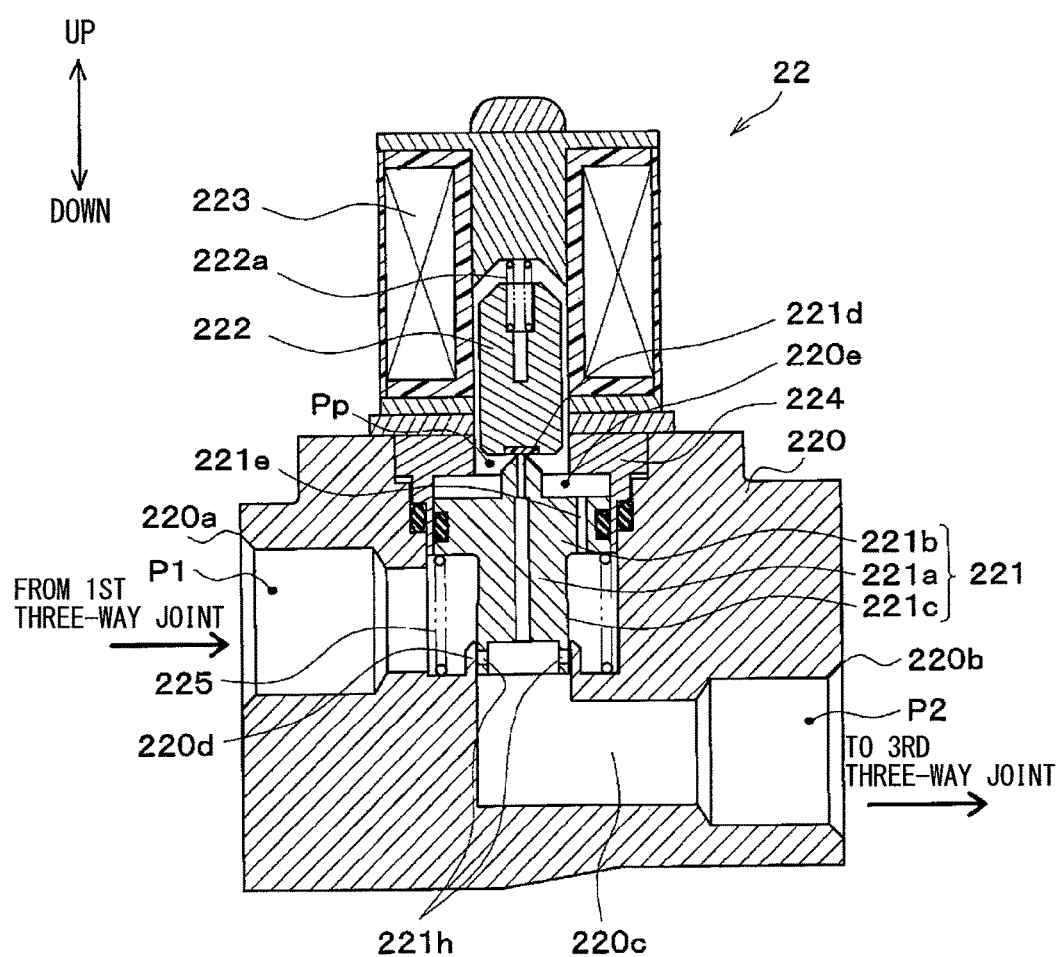
FIG. 29 is a schematic sectional view showing a state in which a main on-off valve of a pilot on-off valve is open, according to a ninth embodiment of the present disclosure.

In a pilot on-off valve 22 of the present embodiment, the seal structure of the main on-off valve 221 of the eighth embodiment is changed as shown in FIG. 29. Specifically, a lower portion of the main on-off valve 221 is formed of a cylindrical portion, and lateral holes 221h, which pass through the outer peripheral side and the inner peripheral side of this cylindrical portion, are provided.

When the main on-off valve 221 is displaced to the seat portion 220d (the lower side in FIG. 29), the lateral holes 221h are covered with the seat portion 220d. Accordingly, the main passage 220c is closed. On the other hand, when the main on-off valve 221 is displaced to the pilot valve 222 (the upper side in FIG. 29) and the lateral holes 221h are moved to the upper side of the seat portion 220d, the inflow port 220a and the outflow port 220b communicate with each other through the lateral holes 221h. Even though the seal structure of the main on-off valve 221 is changed into this seal structure, the same effects as the eighth embodiment can be obtained.

Other Embodiments

This disclosure is not limited to the above-mentioned embodiments, and may have various modifications as described below without departing from the gist of this disclosure. Further, means disclosed in the respective embodiments may be appropriately combined if possible.

(1) Examples in which the second expansion valve 15b having a full-closed function is employed as the downstream open-close device have been described in the above-mentioned embodiments, but the downstream open-close device is not limited thereto. For example, an electric on-off valve (solenoid valve), which is connected to the second expansion valve 15b in series, may be used as the downstream open-close device.

Further, an electric three-way valve, which switches a refrigerant circuit connecting the outflow port 220b of the pilot on-off valve 22 to the inlet side of the second expansion valve 15b and a refrigerant circuit connecting the outlet side of the check valve 17 to the inlet side of the second expansion valve 15b, may be employed instead of the third three-way joint 13c, and the electric three-way valve may be used as the downstream open-close device.

(2) Examples in which the refrigeration cycle device 10 of this disclosure is applied to the vehicle air conditioning system 1 mounted on a hybrid vehicle have been described in the above-mentioned embodiments, but the application of this disclosure is not limited thereto. For example, the refrigeration cycle device 10 of this disclosure may be applied to an air conditioner for a normal vehicle that obtains a drive force for the traveling of a vehicle from an internal combustion engine (engine), and may be applied to an air conditioner for an electric automobile (including a fuel cell vehicle and the like) that obtains a drive force for the traveling of a vehicle from an electric motor for traveling. Of course, the refrigeration cycle device 10 of this disclosure is not limited to an air conditioner for a vehicle, and may be applied to a stationary air-conditioner.

(3) Examples in which the heater core 34 is disposed as a device that heats blown air have been described in the respective above-mentioned embodiments. However, when the refrigeration cycle device 10 is applied to a vehicle of which the amount of heat generated from an engine is not sufficient or a vehicle, such as an electric automobile, not provided with an engine, the heater core 34 may not be provided. Moreover, an electric heater, which generates heat with the supply of electric power, may be employed as an auxiliary device for heating blown air.

(4) Examples in which the air-conditioning control device operates the air-mix door 36 at the time of each of the operation modes, such as the heating mode, the cooling mode, the first dehumidification heating mode, and the second dehumidification heating mode so as to allow the air-mix door 36 to close any one of the air passage formed on the side where the indoor condenser 12 (the heater core 34) is disposed and the cold air bypass passage 35 have been described in the respective above-mentioned embodiments, but the operation of the air-mix door 36 is not limited thereto.

For example, the air-mix door 36 may be adapted to open both the air passage formed on the side where the indoor condenser 12 (the heater core 34) is disposed and the cold air bypass passage 35. Further, it may be possible to adjust the temperature of air, which is blown into the vehicle interior, by adjusting a ratio between the air volume of air passing through the air passage formed on the side where the indoor condenser 12 is disposed and the air volume of air passing through the cold air bypass passage 35. This temperature adjustment is effective in terms of the fine adjustment of the temperature of blown air.

(5) Examples in which the respective operation modes are switched by the execution of the air-conditioning control program have been described in the respective above-mentioned embodiments, but the switching of the respective operation modes is not limited thereto. For example, operation mode setting switches used to set the respective operation modes are provided on the operation panel, and the heating mode, the cooling mode, and the first and second dehumidification heating modes may be switched according to operation signals of the operation mode setting switches.

What is claimed is:

1. A refrigeration cycle device comprising:
   a compressor that compresses and discharges a refrigerant;
   a first expansion valve configured to depressurize a high-pressure refrigerant discharged from the compressor;
   a bypass passage connecting a portion of a cycle, which extends from a discharge port side of the compressor to an inlet side of the first expansion valve, and a portion of the cycle, which extends from an outlet side of the first expansion valve to a suction port side of the compressor;
   a pilot on-off valve that opens or closes the bypass passage, the pilot on-off valve including an inflow port into which a refrigerant flows, and an outflow port from which a refrigerant flows out;
   a second expansion valve configured to open or close a refrigerant passage through which a refrigerant flowing out of the pilot on-off valve passes; and
   a controller configured to control the pilot on-off valve and the second expansion valve to reduce a pressure difference between a refrigerant pressure in the inflow port and a refrigerant pressure in the outflow port, wherein
   the pilot on-off valve includes a main on-off valve that opens or closes the bypass passage, and a pilot valve that opens or closes a communication passage through which the inflow port and the outflow port communicate with each other,
   when the controller reduces the pressure difference, the controller is further configured to increase the refrigerant pressure in the outflow port by controlling the pilot valve to open the communication passage and controlling the second expansion valve to close the refrigerant passage, and the main on-off valve is configured to open the bypass passage when the controller reduces the pressure difference to a predetermined reference pressure difference or less.

2. The refrigeration cycle device according to claim 1, wherein
the pilot on-off valve includes:
a body that includes the inflow port into which a high-pressure refrigerant flows, the outflow port from which a refrigerant from the inflow port flows out, and a main passage guiding a refrigerant from the inflow port to the outflow port;
the main on-off valve that opens the main passage when the pressure difference between the refrigerant pressure in the inflow port and the refrigerant pressure in the outflow port becomes lower than or equal to the reference pressure difference;
the pilot valve that opens or closes the communication passage through which the inflow port and the outflow port communicate with each other, and
when the pilot valve opens the communication passage while the second expansion valve closes the refrigerant passage, the refrigerant pressure in the outflow port is increased by the high-pressure refrigerant guided from the inflow port to the outflow port through the communication passage.

3. The refrigeration cycle device according to claim 2, wherein
the pilot on-off valve includes:
a pilot space forming member that defines a pilot space into which a refrigerant is introduced to have a pressure biasing the main on-off valve in a valve closing direction; and
an elastic member that applies a load biasing the main on-off valve in a valve opening direction,
the communication passage includes an inlet-side communication passage through which the inflow port and the pilot space communicate with each other, and an outlet-side communication passage through which the pilot space and the outflow port communicate with each other, and
when the pilot valve closes the outlet-side communication passage, the high-pressure refrigerant is guided from the inflow port to the pilot space through the inlet-side communication passage so that the main on-off valve closes the main passage.

4. The refrigeration cycle device according to claim 3, wherein
a refrigerant passage area of the inlet-side communication passage is larger than a refrigerant passage area of the outlet-side communication passage.

5. The refrigeration cycle device according to claim 3, wherein
the pilot on-off valve includes a passage area-reducing portion that reduces a refrigerant passage area of the inlet-side communication passage when the main on-off valve opens the main passage.

6. The refrigeration cycle device according to claim 3, wherein
the pilot on-off valve includes a passage area-increasing portion that increases a refrigerant passage area of the outlet-side communication passage when the main on-off valve opens the main passage.

7. The refrigeration cycle device according to claim 1, wherein
when the pilot valve opens the communication passage while the second expansion valve closes the refrigerant passage, the controller prevents the pilot on-off valve from opening the bypass passage until the pressure difference becomes less than or equal to the reference pressure difference.

8. The refrigeration cycle device according to claim 1, wherein
the communication passage includes an inlet-side communication passage through which the inflow port and the pilot space communicate with each other, and an outlet-side communication passage through which the pilot space and the outflow port communicate with each other, and
a cross-sectional area of the inlet-side communication passage is larger than a cross-sectional area of the outlet-side communication passage.

9. The refrigeration cycle device according to claim 1, wherein
the pilot on-off valve is configured to increase a refrigerant pressure in the outflow port to be equal to a refrigerant pressure in the inflow port by the pilot valve opening the communication passage while the second expansion valve closes the refrigerant passage.

* * * * *